United States Patent [19]
Cooper

[11] 4,085,291

[45] Apr. 18, 1978

[54] SYNTHETIC SUPPLEMENTARY CHANNEL MATRIX DECODING SYSTEMS

[76] Inventor: Duane H. Cooper, 918 W. Daniel St., Champaign, Ill. 61820

[21] Appl. No.: 701,228

[22] Filed: Jun. 30, 1976

Related U.S. Application Data

[63] Continuation-in-part of Ser. No. 468,238, May 9, 1974, Pat. No. 3,985,978, Ser. No. 578,078, May 16, 1975, Pat. No. 3,970,788, which is a continuation-in-part of Ser. No. 288,873, Sep. 13, 1972, Pat. No. 3,906,156, and Ser. No. 187,065, Oct. 6, 1971, Pat. No. 3,856,992.

[51] Int. Cl.$^2$ .............................................. H04R 5/00
[52] U.S. Cl. ........................ 179/1 GQ; 179/100.4 ST
[58] Field of Search ......... 179/1 GQ, 1 G, 100.1 TD, 179/100.4 ST, 15 BT

[56] References Cited

U.S. PATENT DOCUMENTS

| | | | |
|---|---|---|---|
| 3,906,156 | 9/1975 | Cooper | 179/1 GQ |
| 3,943,287 | 3/1976 | Gravereaux et al. | 179/1 GQ |
| 3,997,725 | 12/1976 | Gerzon | 179/1 GQ |

Primary Examiner—Douglas W. Olms
Attorney, Agent, or Firm—Fitch, Even, Tabin & Luedeka

[57] ABSTRACT

Apparatus and methods relating to "quadrasonic" encoding and decoding systems, including synthetic supplementary channel systems, matrix logic systems, and systems employing stereo compatible matrix variations.

14 Claims, 21 Drawing Figures

Fig. 5.
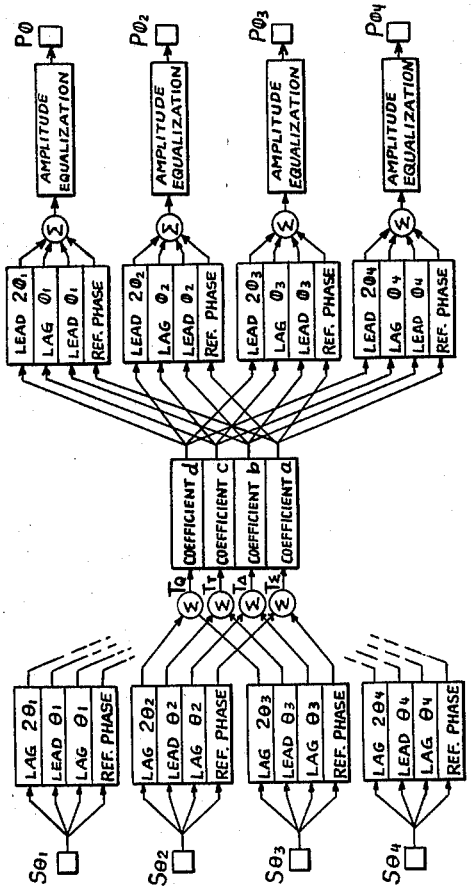
Fig. 7.
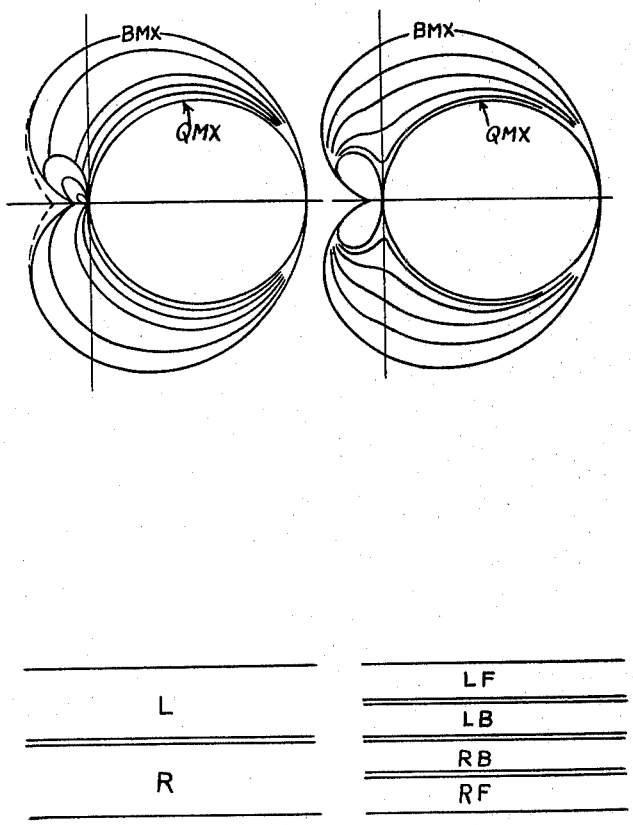
Fig. 8.
Fig. 6.
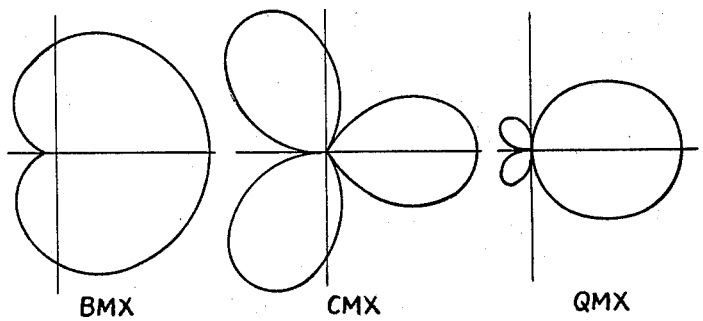

ENVELOPE LEVELER

GENERATOR OF COMPLIMENT OF FILTER GAIN FUNCTION, THE BIAS SIGNAL $b$

ENVELOPE LEVELER (ALTERNATE)

ENVELOPE GENERATOR

SYNTHETIC SUPPLEMENTARY CHANNEL MATRIX DECODING SYSTEMS

This application is a continuation-in-part of my application Ser. No. 468,238 filed May 9, 1974, (now U.S. Pat. No. 3,985,978), Ser No. 578,078 filed May 16, 1975 (now U.S. Pat. No. 3,970,788) which are continuation-in-part of Ser. No. 288,873 filed Sept. 13, 1972 (now U.S. Pat. No. 3,906,156) and application Ser. No. 187,065 filed Oct. 6, 1971 (now U.S. Pat. No. 3,856,992), which are hereby incorporated herein by reference. Various subject matter described herein is disclosed in Patent Office Disclosure Documents 035254, 035255, and 035256 filed Sept. 10, 1974.

The present invention relates to apparatus and methods for preparation, recording or transmission, and production of multidirectional audio signals in a manner to provide an enhanced perception of those directional qualities and realism in comparison to conventional stereo practice. More particularly, the present invention is directed to multichannel encoding and decoding of multidirectional audio signals, and to encoding variations and logic systems in connection therewith.

Multidirectional audio recording and reproduction systems are often designated as quadrasonic systems, because four loudspeakers in a square array centered on a listener are often used. In such quadrasonic systems, the reproduction loudspeaker locations are conventionally designated LF, RF, LB, and RB, for the left front, right front, left back and right back loudspeaker directions, respectively, with respect to their bearing angles referred to that listener. In one method of preparing audio signals for reproduction through such loudspeakers, four directional microphones are used to generate directional source signals which may be designated $S_{LF}$, $S_{RF}$, $S_{LB}$ and $S_{RB}$ for source signals from the left front, right front, left back, and right back reference directions. Linear combinations of these signals may be encoded into four transmission signals for broadcast and/or recording purposes. The encoded transmission signals may be broadcast or recorded on independent channels or tracks, or may use subcarrier modulation techniques for broadcasting or disc recording. It is the function of the encoding apparatus to prepare such linear combinations as may be particularly suited to the specific recording or transmission means to be used, and many specific linear combinations have been devised for the encoding of the source signals in the transmission signals.

It is frequently desired that only one or more of the four transmission signals be usable for a more limited, but balanced portrayal of the available directional information detected by the source microphones, namely, that the use of some of these transmission signal channels be compatible with existing audio systems using fewer channels. For example, in FM broadcast applications it is desired that one such transmission channel be suitable for monaural reproduction. In this connection, this monaural-compatible transmission signal, which may be designated "M" should desirably consist of the linear sum combination of the source signals, as follows:

$$M = S_{LF} + S_{RF} + S_{LB} + S_{RB} \tag{1}$$

Similarly, it is desired that one further channel serve as a left-right compatible stereo-difference channel. In this connection, the stereo difference channel, which may be designated "Y" may consist of the linear, left-right difference combination of the directional source signals, as follows:

$$Y = S_{LF} - S_{RF} + S_{LB} - S_{RB} \tag{2}$$

for modulation of a 38-kHz subcarrier in the usual manner for conventional stereo broadcast which is suitable for compatible reception by a conventional stereo receiver.

The remaining transmission channels may be regarded as supplementary to the mono- and stereo-difference channels, and the necessary independent linear combinations for these may be arbitrarily selected, or else devised to suit further compatibility requirements. For example, one such transmission signal may be $S_{LB}$ with null contribution from the other source signals, while the other may be $S_{RB}$ with null contributions from the other source signals. After study, it is seen that a suitable decoder, forming linear combinations of M, Y, $S_{LB}$, $S_{RB}$ to form each of the source signals separately, is possible. On the other hand, if the four source signals be sequentially sampled, then the encoding and subcarrier modulation may be done as one step. The M and Y transmission channels then remain as above, and the supplementary channels appear as a front-back difference channel (designated "X"):

$$X = S_{LF} + S_{RF} - (S_{LB} + S_{RB}), \tag{3}$$

as a modulation on a quadrature-phase 38-kHz subcarrier, and a diagonal-difference channel (designated "U"):

$$U = S_{LF} - (S_{RF} + S_{LB}) + S_{RB} \tag{4}$$

appearing as modulation on a 76-kHz subcarrier. This method of forming linear combinations, or matrixing, as it is called, has the further compatibility advantage in that, if the U channel not be transmitted or received, i.e., be silent, then the decoding means already devised for M, X, Y, and U still provides a satisfactory decode for four-loudspeaker presentation, in that the signal intended for a given loudspeaker exhibits a suppression of the appearance of the other source signals by about 9.5 decibels, a suppression nearly as satisfactory as the practical values, e.g., 20 decibels or better, often obtained if U be not omitted. The resulting matrix is known as a 4–3–4 matrix, to distinguish it from the U-included, or 4–4–4 case.

Other 4–4–4 matrixing methods have been employed for disc recording. In the CD-4 system, for example, the stereo-compatible recording channels are shown below as L and R:

$$l = S_{LF} + S_{LB} \tag{6}$$

$$L' = S_{LF} - S_{LB} \tag{7}$$

$$R = S_{RF} + S_{RB} \tag{8}$$

$$R' = S_{RF} - S_{RB} \tag{9}$$

while L' and R' are supplementary channels appearing as modulations of ultrasonic subcarriers on the same groovewalls of the disc.

It is characteristic of these conventional systems that they produce stereo-compatible signals that contain only left-right information, and omit any further information allowing for the differentiation of front from back, if only the first two transmission channels be used. Thus, the four-loudspeaker decode from two channels is directionally defective, i.e., an adequate 4-2-4 matrix is not contained in such systems. Such 4-2-4 matrices, of varying degrees of adequacy, however, have been devised specifically for applications in which the transmission or recording of more than two channels would be prohibitively difficult. The well-known QS and SQ matrices are examples of such 4-2-4 systems.

In the previously referred to patents and applications of the present inventor, there are described multichannel matrices, here designated by the generic name UMX, that include specific 4-2-4, 4-3-4, and 4-4-4 cases merely by deletion of certain of the transmission channels. These provide for the encoding of directional information into transmission channels which may be in accordance with the following embodiments of specific encode equations:

$$T_\Sigma = \sum_{i=1}^{n} S_i, \quad (10)$$

$$T_\Delta = \sum_{i=1}^{n} S_i \exp(-j\theta_i), \quad (11)$$

$$T_T = \sum_{i=1}^{n} S_i \exp(j\theta_i), \quad (12)$$

$$T_Q = \sum_{i=1}^{n} S_i \exp(-j2\theta_i), \quad (13)$$

in which $\exp(j\theta)$ designates a leading phase-shift of all frequency components of the audio signal in the amount designated by the phase angle $\theta$. This phase shift is in excess of any frequency-dependent reference phase applied in common to all signals in forming $T_\Sigma$. These relative phase shifts $\theta_i$ may be made equal to the bearing angles describing the intended bearing-angle locations for each of the source signals $S_i$, and these bearing angles may be measured counterclockwise from the center right (CR or 0°) bearing, the midbearing between the right front (RF) and the right back (RB) directions.

The decoding of these signals to provide signals for presentation via loudspeakers, for example, at specific bearing angles $\phi$ (as shown in FIG. 2) may be carried out in accordance with the following equation:

$$P_\phi = T_\Sigma + T_\Delta \exp(j\phi) + T_T \exp(-j\phi) + T_Q \exp(2j\phi) \quad (14)$$

The resulting overall encode-decode signals obey the equations:

$$P_\phi = 4\Sigma_i S_i \cos(\phi-\theta_i) \cos\tfrac{1}{2}(\phi-\theta_i) \exp\tfrac{1}{2} j(\phi-\theta_i) \quad (15)$$

The characteristic kernel of the above equation:

$$M_4 = \cos(\phi-\theta) \cos\tfrac{1}{2}(\phi-\theta) \exp\tfrac{1}{2} j(\phi-\theta) \quad (16)$$

fully characterizes the directional properties of the overall matrix. It is a single-valued, 360°-repetitive function of the single variable $\alpha = \phi - \theta$. These directional properties are shown in the polar plot of the magnitude of this kernel as labelled "QMX" in FIG. 3 of the drawings.

If the fourth transmission signal $T_Q$ be made null, the overall encode-decode signals obey the equation:

$$P_\phi = 3 \Sigma_i S_i [\tfrac{1}{3} + \tfrac{2}{3} \cos(\phi-\theta_i)] \quad (17)$$

with the characteristic kernel $$M_3 = \tfrac{1}{3} - \tfrac{2}{3} \cos(\phi-\theta) \quad (18)$$

shown plotted in its magnitude as the polar plot labelled "TMX" in FIG. 3 of the drawings. This kernel is a single-valued, 360°-repetitive function of the single variable $\alpha = \phi - \theta$. Also, if both transmission channel $T_Q$ and transmission channel $T_T$ be made null, the overall encode-decode signals obey $$P_\phi = 2\Sigma_i S_i \cos\tfrac{1}{2}(\phi-\theta_i) \exp\tfrac{1}{2} j(\phi-\theta_i) \quad (19)$$

with the characteristic kernel $$M_2 = \cos\tfrac{1}{2}(\phi-\theta) \exp\tfrac{1}{2} j(\phi-\theta) \quad (20)$$

also shown plotted in its magnitude as the polar plot labelled "BMX" in FIG. 3. This kernel is also a single-valued, 360°-repetitive function of the single variable $\alpha = \phi - \theta$.

These embodiments of kernel functions have a magnitude which is symmetric about the null difference angle $\alpha = \phi - \theta$, namely, about $\alpha = 0°$, whereas the phase of the kernel functions is antisymmetric about $\alpha = 0°$, positive phases for $\alpha > 0°$ being matched by negative phases for $\alpha > 0°$. These relations are called axial symmetry. The illustrated TMX kernel also obeys this phase rule albeit vacuously, the phases being zero except for the values of $\alpha$ beyond $\pm 120°$ where 180° phase is obtained. In all cases, it is noted that a relative maximum is obtained at $\alpha = 0°$ and a relatively small value at $\alpha = 180°$.

These kernel functions also exhibit rotational symmetry in that, regarded as functions of $\phi$, the orientation of the plot depends upon the value of $\theta$. This is illustrated in FIG. 4 for the QMX kernel. In this illustration of FIG. 4, the four radial lines may be regarded as indicating loudspeaker placements, and the intercept of these lines with the polar curve may be regarded as indicating, by the distance from the center to the intercept, the magnitude of the signal supplied to the loudspeaker from a given source. The dashed line indicates the axis of symmetry of the kernel, and this axis points to the source location for a single source. Eight such source locations are shown, and the rigid body rotation of the kernel to follow the source location (rotational symmetry) is evident.

Because the optimal shape by psycho-acoustic criteria for the kernel function is not precisely known, it may be useful to provide for alternate decoding means by introducing variable coefficients according to the equation:

$$P_\phi = aT_\Sigma + bT_\Delta \exp(j\phi) + cT_T \exp(-j\phi) + dT_Q \exp(2j\phi) \quad (21)$$

so that an overall encode-decode kernel function would be proportional to:

$$a + b[\exp j(\phi-\theta)] + c[\exp j(\theta-\phi)] + d[\exp 2j(\phi-\theta)] \quad (22)$$

Examples of the effects of various adjustments of the coefficients $a$, $b$, $c$, and $d$ are discussed in previously referred to patent applications. FIG. 5 schematically shows the introduction of such coefficients. Further discussion is undertaken in the present application.

In the previously referred to applications, linear combinations of the $T_\Sigma$ and $T_\Delta$ transmission signals are disclosed which may be used as the left and right channels for disc recording. These signals, which are designated $T_L$ for the left channel signal and $T_R$ for the right channel signal, may be formed as follows:

$$T_L = \frac{1}{2}(T_\Sigma - T_\Delta) \quad (23)$$

$$T_R = \frac{1}{2}(T_\Sigma + T_\Delta) \quad (24)$$

The $T_L$ and $T_R$ signals correspond to BMX (two transmission channel) decodes for center left ($\phi = 180°$) and center right ($\phi = 0°$) and thus form stereo-compatible channels, while being also decodable to yield quadrasonic presentation obeying the BMX kernel. The remaining channels $T_T$ and $T_Q$ then serve the role of supplementary channels as in the examples of FM broadcasting and disc recording discussed above. There remains the improvement, however, in that the stereo-compatible channels are decodable for quadrasonic presentation.

When these UMX signals are to be recorded on a disc, the channels $T_L$ and $T_R$ may be recorded in the usual manner together with high-frequency carriers superposed in each of the groovewall modulations, the carriers being phase modulated by frequency emphasized versions of $$C_L = \frac{1}{2}(T_T + T_Q) \quad (25)$$

$$C_R = \frac{1}{2}(T_T - T_Q) \quad (26)$$

where $C_L$ is the left groovewall carrier channel and $C_R$ is the right groovewall carrier channel in one embodiment. With due regard for the sum-difference combinations, $T_L$ and $T_R$ may be decoded to provide signals obeying the BMX kernel plotted in FIG. 6, whereas the decoding of $C_L$ and $C_R$ provides signals obeying the CMX kernel $$\cos \frac{3}{2}(\phi - \theta) \exp \frac{1}{2} j(\phi - \theta) \quad (27)$$

shown plotted also in FIG. 6. Half the sum of the two comprises the QMX kernel of FIG. 6.

Since the BMX information and the CMX information are transmitted by different means, it is not always possible to ensure their combination in exactly equal proportion, so that the "$a$" and "$b$" coefficients of Equation (21) may not be exactly equal to the "$c$" and "$d$" coefficients, resulting in a matrix imbalance. As an illustration, the effect of such imbalances which do not disturb axial or rotational symmetry has been calculated and plotted in FIG. 7. In the plots at the left of FIG. 7, the effects of reducing the CMX contribution by varying decibel amounts are shown in the plots, with "backlobes" omitted in the lower portion for the sake of clarity. The dashed curve shows the effect in the BMX kernel alone caused by a 3-dB imbalance.

The effects of imbalance together with phase shift are also shown in the plots at the right of FIG. 7, the imbalance being related to the phase as in the case of a first-order filter, 3-dB being plotted together with a 45° phase shift, for example. The psychoacoustic consequences of the imbalance shown here or discussed in the copending application remain largely unknown. It is known, however, that more precise localizations obtain with QMX rather than BMX kernels, and that a 10-dB reduction in the CMX contribution has rather little psychoacoustic effect, as does the elimination of TQ altogether.

In U.S. Pat. No. 3,906,156 it is observed that the CMX channels may be limited in bandwidth without significant psychoacoustic degradation. If this be done by means of first-order, low-pass filters without phase compensation, then the kernel will progressively change with frequency as in the right-most plot of FIG. 7. In Equation (21), the effect is that the coefficients "$c$" and "$d$" being frequency-dependent in magnitude and phase. However, if a matching phase characteristic, but without amplitude variation, be inserted for the coefficients "$a$" and "$b$," then the kernel will progressively change with frequency as in the left-most plot of FIG. 7.

Evidently, the smoothly changing kernel, without loss of axial or rotational symmetry, helps minimize the psychoacoustic consequences of the bandwidth reduction for the CMX contribution. However, the full explanation of the psychoacoustic acceptability must also rest upon the properties of human hearing being different at different frequencies, with regard to the perception of directional effects.

That the perception of directional effects depends upon frequency is widely believed. For example, at low-frequencies, it is believed that the perception depends upon phase differences in the acoustic signals present at the two ears, while at high frequencies the dependence is mainly upon amplitude differences. However that may be, no precise, reliable mathematical formulation is available. The understanding of these phenomena is further complicated by the fact that the mere presence of a listener's head in the acoustic sound field produces a distortion of the field, so that the relation of the acoustic signals at the ears to the original acoustic-field signals at those same points is an extremely complicated relation. At high frequencies (i.e., wavelengths comparable to, or smaller than typical head dimensions) exceedingly complicated phase and amplitude relations, for example, are the rule. The complexity of these relations may make it credible that the ordinary observation of acute directional perception of single point-source images at high frequencies does not necessarily extend to phantom-source imaging--an imaging possibility that is not prescribed in nature.

Even at moderate frequencies, phantom-source imaging is poorly understood. In two-speaker stereo practice, for example, a centered phantom image is usually obtained by providing the two loudspeakers with identical signals. If, however, a phase shift of 180° be introduced between the two signals, most listeners find the image to be disturbed--either unstable in location or else appearing to be greatly spread out--and the localization experience to be productive of a certain degree of auditory distress. With a 90° phase shift, on the other hand, many listeners find no change in image quality, in comparison to 0°, while others require the phase shift to be reduced to 45°, or less, before they report no change.

Even at 0° of phase, many listeners find the phantom image to exhibit instability and broadening in comparison to single point-source images. The phase shifts at the listener's ears, and the amplitude relations as well, bear no simple relation to the loudspeaker-signal phases, of course.

In quadrasonic imaging, the introduction of two additional loudspeakers provides the opportunity for more elaborate structuring of the signals presented, via the intervening acoustic space, to the two ears. For example, in seeking to establish a center-front phantom image, the equal excitation of the two front loudspeakers, previously known to be quite effective from two speaker stereo practice, may be supplemented by suitably phased, low amplitude excitation of the back loudspeakers. For example, if a TMX kernel be used, the two back loudspeakers may be supplied with equal signals, as are the two front loudspeakers, but the back signals may be lower in level by about 15.8-dB and show a 180° phasing relative to the front. Experiments have shown that the presence of these back signals stabilizes the center-front phantom image, to the extent of reducing localization disagreements among various listeners by about 50%.

Similar experiments have been performed in which the back signals are phased 135° relative to one another at a level of 7.7-dB below the front level, but with 45° phasing relative to the front (BMX kernel) or with 135° phasing relative to the front (QMX kernel). The stabilization of center-front phantom-image localization is similar in these two cases to that observed in the TMX kernel case cited above. Evidently, the phasing of the back signals in these three cases serves to "repel" the image from the back location to stabilize imaging at the front location. Repulsion of the image away from the lower-level loudspeaker in 180° phasing of stereo-pair loudspeaker presentations is a well-known phenomenon, particularly at frequencies such that the acoustic wavelengths are not small compared to head dimensions.

The phase and amplitude differences are slight at extremely low frequencies between acoustic signals at the two ears, as caused by simple sources. Directional perception is also not quite so acute as at the middle frequencies, although human hearing may be more sensitive to these phase differences that do remain. The importance and phasing of kernel backlobes for phantom imaging may well be different at such low frequencies, e.g., below about 100 Hz, than appear to be the case at middle frequencies, say 100 Hz to 2000 Hz. For these reasons, it would be useful to provide decode apparatus in which a set of coefficients "$a$," "$b$," "$c$," and "$d$" of Equation (21) may be provided or selected for signal frequency values below some low frequency such as about 100 Hz which is different from the corresponding set of coefficients used above that frequency.

In some signal transmission and recording systems, it is desired to avoid the technological complications and costs of providing more than two transmission channels. In such cases, it is then desired to find a means of enhancing the psychoacoustic quality of the images that may be obtained from the presentation signals of the 4–2–4 matrices that may be employed. This enhancing means has been called "logic," a means of detecting signal conditions corresponding to a single image and either adjusting the matrix coefficients or adjusting the gains in the presentation channels to reduce the crosstalk into undesired channels. The provision of improvements and advances in the area of "logic" or image location enhancement in multidirectional sound systems would be desirable in respect of providing the performance enhancement for multidirectional sound systems appropriate to such techniques.

As indicated, the previously referred to patent applications describe generally an encoding matrix system known as the UMX system, and include description of various specific matrix embodiments of the system. However, improvements and variations in such matrix systems for particular purposes would be of interest, such as matrix variations relating to particular aspects of stereo compatibility in tape and disk recording.

Accordingly, it is an object of the present invention to provide improvements in multidirectional signal matrixing systems. It is a further object to provide for image location enhancement in multidirectional sound reproducing systems. Another object is the provision of matrix embodiments relating to particular aspects of stereo compatibility in tape and disk recording.

These and other objects will be apparent from the following detailed description and the accompanying drawings of which:

FIG. 5 is a block diagram of an embodiment of a 4-4-4 matrixing system;

FIG. 6 is a series of three polar plots of the magnitude of several characteristic presentation kernel embodiments;

FIG. 7 is a polar plot illustrating the effects of matrix imbalance in certain matrix embodiments;

FIG. 8 is a schematic illustration of magnetic tape tracks for multichannel recording;

Figure 1:
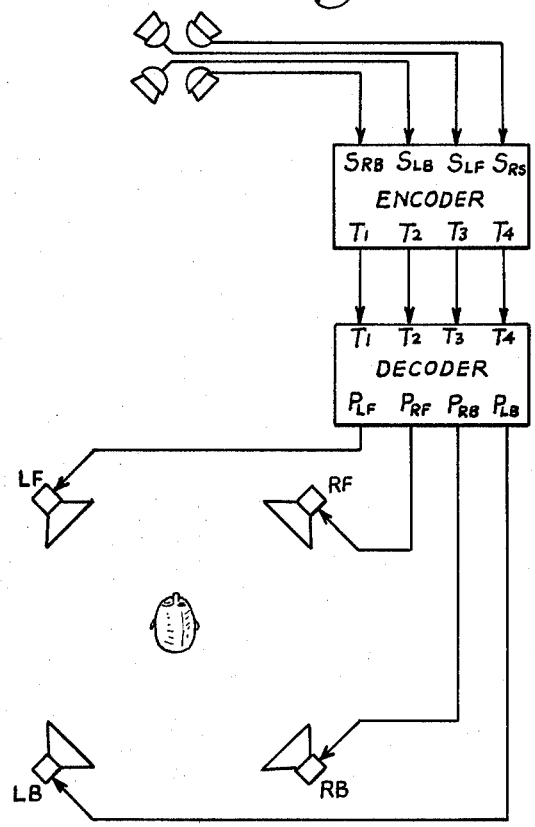
FIG. 1 is a general schematic illustration of one type of quadrasonic sound system.
Figure 2:
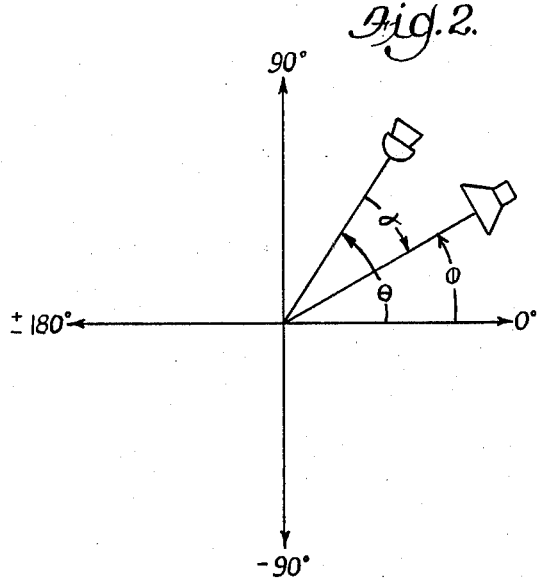
FIG. 2 is a schematic view illustrating certain angular relations useful in matrix encoding and decoding.
Figure 3:
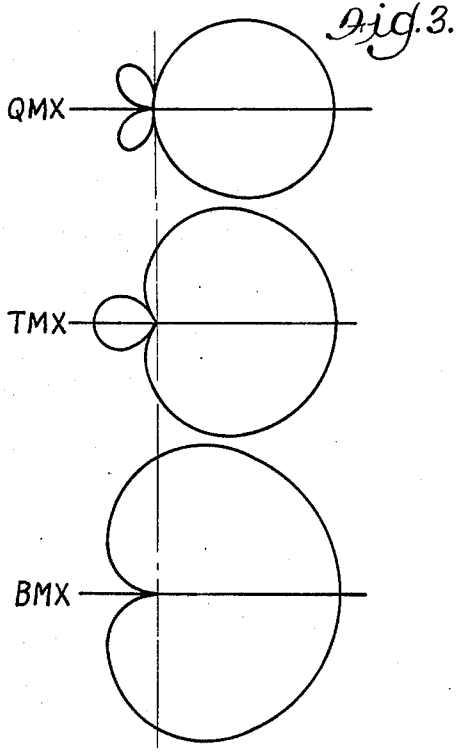
FIG. 3 is a series of three polar plots of the magnitude of the characteristic presentation kernels of certain embodiments of four, three and two transmission channel matrix systems.
Figure 4:
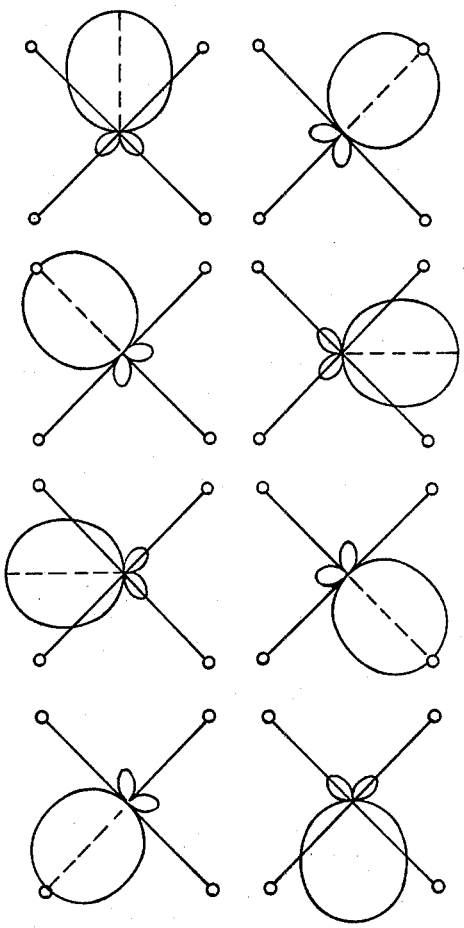
FIG. 4 is an illustration of the rotational symmetry of the specific four transmission channel presentation kernel function of FIG. 3.

The present invention concerns multidirectional sound systems, including encoding and decoding methods and apparatus, in which multidirectional source signals are transmitted, in matrixed form, in a plurality of channels including two basic transmission channels. In such systems, the multi-directional source signals are generally encoded in the two basic channels with predetermined amplitude and phase relations indicative of source directions, and the encoded channels are adapted to be decoded for formation from the signals in said two channels of more than two loudspeaker presentation signals having source signals corresponding to every source direction appearing in a plurality of such presentation signals but in differing relative amplitude. Advantageously, the two basic transmission channels are monaural and stereo compatible channels, and accordingly may be utilized directly as "left" and "right" presentation signals in accordance with conventional stereo practice and through the use of conventional stereophonic equipment. In this connection, the term "transmitted" as used herein will be understood to include the various forms of recording or signal-storage, such as phonograph records and tapes, and a principal application of the various aspects of the present invention relates directly to the decoding of signals transmitted from the groovewalls of a phonograph recording disk. Such recording disks may also be monaural and stereo compatible, such that they may be utilized directly with conventional monaural record players or stereophonic playback equipment.

As indicated previously, aspects of the present disclosure are directed to presentation image location enhancement, and this aspect of the present disclosure is particularly applicable to multidirectional sound systems in which the source signals are transmitted to the decoder in at least two original transmission channels. In accordance with this aspect of the present invention, at least one synthetic supplementary channel is generated from the original encoded transmission channels, with the source signals in the synthetic supplementary channels having predetermined amplitude and phase relations differently indicative of source directions relative to the amplitude and phase relations of the multidirectional source signals encoded in the original transmission channels.

The amplitude and phase relations of the source signals in the synthetic channels are determined by detection of single-image conditions from the signals of the original transmission channels, and determining synthetic re-encode amplitude and phase coefficients differently indicative of source directions in respect of that image location.

The signals of the original channels and the synthetic channels are then decoded to form multidirectional presentation signals having image location which is enhanced with respect to the image location which would be provided by decoding the original channels without the synthetic channels. Generally, this decoding of the original transmission channels and the synthetic channels may be carried out by decoding the original channels to provide a first set of more than two loudspeaker presentation signals for presentation at more than two listening space bearing angles and having source signals corresponding to every source direction appearing in a plurality of such presentation signals but in different relative amplitude, and decoding the synthetic channel or channels to provide a second set of a plurality of presentation signals for presentation at listening space bearing angles corresponding to the listening space bearing angle presentation directions of said first set of presentation signals. The two sets of presentation signals are combined by adding to each signal of the first set of presentation signals the signal of said second set of presentation signals for the corresponding listening space bearing angle to provide a plurality of output signals. The output signals are for the presentation directions corresponding to the presentation directions of the first set of presentation signals, but with a sharpened directionality pattern with respect to that of the set of presentation signals obtained from the original signals. The extent to which the synthetic supplementary channels are included in the decode will generally be determined by the degree to which the signals of the original transmission channels are interpreted to represent single image (saliency) conditions.

This synthetic approach to image enhancement differs from previous approaches in providing means for generating one or more synthetic channels from the original two channel quad input and quad presentation speaker matrix (4-2-4 matrix), and the insertion of these synthetic channels are supplementary channels into the decode matrix of the correspondingly increased transmission channel matrix, such as a 4-4-4 system where two synthetic supplementary channels are generated.

This aspect of the present disclosure will be subsequently described in detail in respect of a two original channel matrix, with the understanding that the principles disclosed may be applied to the use of three or more original channels. Since there exists no linear means of obtaining mutually-independent 4-channel signals from the original two channels of a two channel matrix, nonlinear means are provided for the detection of single-image conditions, and for determining synthetic re-encode coefficients for that image in a form suitable for representation in the synthetic supplementary channels. The extent to which these synthetic channels are allowed to contribute to the decode is determined by the degree to which the signal conditions in the two original channels may be interpreted as representing single-image conditions, for example, by adjusting the $a,b,c,d$ coefficients of Equation (21) where $c$ and $d$ are the respective coefficients of two synthetically generated supplementary channels which may be reduced or nulled for non-salient conditions and made equal to the $a$ and $b$ coefficients of the two original channels for fully salient conditions. The speed with which the synthetic contribution is provided and the speed with which it is removed are called attack and release speeds corresponding to characteristic attack and release times. These three conditions, the saliency of single-image conditions, attack time, and release time, may be set to match characteristics of human hearing related to the masking of one image by another in psychoacoustics. Means for providing these functions are to be further described with respect to a particular embodiment of a two transmission channel system utilizing mono and stereo compatible BMX channels $T_L$ and $T_R$ in accordance with the UMX matrixing system.

The synthetic channel synthesis involves the generation of phase-shifted audio signals in which the amount of phase shift is based on an estimate of the phase shift used in encoding the salient sources in the original channels. For the case of a two transmission channel system in accordance with the UMX system, the original channels $T_L$ and $T_R$ obtained from the recording medium pickup device, being linear combinations of the $T_\Sigma$ and $T_\Delta$ channels as indicated by Equations (23) and (24), may be readily rematrixed to provide the $T_\Sigma$ and $T_\Delta$ channels $$[T_\Sigma = \tfrac{1}{2}(T_R + T_L); \; T_\Delta = \tfrac{1}{2}(T_R - T_L)]$$

by a simple matrix circuit. For the purposes of the following discussion, the resulting $T_\Sigma$ and $T_\Delta$ signals which also may be utilized directly (e.g., as received from an FM broadcast), are representable, as follows:

$$T_\Sigma = \Sigma_i S_i(t) \quad (28)$$

$$T_\Delta = \Sigma_i [S_i(t)\cos\theta_i - \hat{S}_i(t)\sin\theta_i] \quad (29)$$

in which $\hat{S}_i(t)$ is the leading-phase, 90° phase-shifted version (Hilbert transform) of the ith audio signal $S_i(t)$, and the pair of terms shown in Equation (29) represents a phase shifted version of $S_i(t)$ that lags that audio signal by the phase angle $\theta_i$. A synthetic supplementary audio signal channel $T_{ET}$ may be generated having encoding coefficients differently indicative (from those of the original two channels), as follows:

$$T_{ET} = \Sigma_i [S_i(t)\cos\theta_E + \hat{S}_i(t)\sin\theta_E] \quad (30)$$

The pair of terms shown in Equation (30) forms a phase shifted version of $S_i(t)$ with leading angle $\theta_E$, which is a phase-angle estimate. The phase-angle estimate $\theta_E$ may be formed by phase-lock-loop detection. It will be appreciated that signal $T_{ET}$ may be regarded as a synthetically generated $T_T$ signal in accordance with the UMX system for the estimated phase angle $\theta_E$ of the phase shift used in encoding the salient sources in the original channels.

A phase-lock loop detection system for determining $\theta_E$ comprises one oscillator that is fixed-tuned and one that is voltage-controlled in frequency. The audio signals $T_\Sigma$ and $T_\Delta$ are used to impress single-sideband (SSB) modulation upon the oscillations, with a quadrature phase relation for the carriers, except for the further difference in phase represented by the diffeence between the estimated phase angle $\theta_E$ and the phase angle to which it is to correspond. Phase detection produces a signal proportional to the sine of this phase difference, and this sine signal may be used as an error signal to control adjustment of the frequency of the voltage-controlled oscillator to bring the error signal to a null. Since phase is the time integral of frequency, this phase-lock is phase-rate controlled. The nominal frequency $\omega_o$ for the oscillators may be chosen by convenience but should be more than twice the highest frequency in the audio signals. In this connection, it should be noted that the synthetic channels may have a limited frequency range as described and claimed in parent application Ser. No. 578,078 for the auxiliary channels, and such limited frequency range auxiliary supplementary channels are particularly suited for use with decoders adapted for use with originally transmitted, limited frequency range auxiliary channels.

The SSB signal formed from the original channel signal $T_\Sigma$ is:

$$\sigma_E(t) = \Sigma_i [S_i(t)\cos(\omega_o t + \theta_E) - \hat{S}_i(t)\sin(\omega_o t + \theta_E)] \quad (31)$$

using the voltage-controlled oscillator. The SSB signal $\delta(t)$ formed from the original channel signal $T_\Delta$ is representable as follows:

$$\delta(t) = \Sigma_j [S_j(t)\cos\theta_j \sin\omega_o t - \hat{S}_j(t)\sin\theta_j \sin\omega_o t$$
$$+ \hat{S}_j(t)\cos\theta_j \cos\omega_o t + S_j(t)\sin\theta_j \cos\omega_o t]$$
$$= \Sigma_j [S_j(t)\sin(\omega_o t + \theta_j) + \hat{S}_j(t)\cos(\omega_o t + \theta_j)] \quad (32)$$

Upon phase detection, the low-pass-filtered version of the product of these two signals, $$\sigma_E(t)\,\delta(t)\Big|_{LP}$$

may be provided, as follows:

$$\sigma_E(t)\,\delta(t)\Big|_{LP} = \tfrac{1}{2}\Sigma_{ij}[S_iS_j\sin(\theta_j - \theta_E) - \hat{S}_i\hat{S}_j\sin(\theta_E - \theta_j)$$
$$+ S_i\hat{S}_j\cos(\theta_j - \theta_E) - \hat{S}_jS_i\cos(\theta_i - \theta_E)] \quad (33)$$

Since the phase-lock loop forms a long-term average and since this average vanishes for $S_i\hat{S}_j$, for all $i$ and $j$, the effective error signal $$\sigma_E(t)\,\delta(t)\Big|_{LP,AV}$$

(representing the low-pass filtered, long-term averaged signal) may be represented by:

$$\sigma_E(t)\,\delta(t)\Big|_{LP,AV} = \Sigma_{ij}\tfrac{1}{2}(S_iS_j + \hat{S}_i\hat{S}_j)\Big|_{AV}\sin(\theta_j - \theta_E) \quad (34)$$

For independent sources, this error signal may be represented by:

$$\sigma_E(t)\,\delta(t)\Big|_{LP,AV} = \Sigma_i S_i^2\Big|_{AV}\sin(\theta_i - \theta_E) \quad (35)$$

The signal $$\sigma_E(t)\,\delta(t)\Big|_{LP,AV}$$

will be dominated by the salient source, and is to be minimized by the phase-lock-loop control of $\theta_E$. The low-pass filtering may have a cutoff frequency of less than $\tfrac{1}{2}\omega_o$, but not less than the highest source signal frequency to be transmitted. The long-term averaging time (which may be provided by a low-pass filter) may be selected to be not shorter than the attack time of the control circuitry.

A synthetic channel $T_{ET}$ may be derived from the formation of the following signals:

$$\Sigma_i S_i(t)\cos(\omega_o t + \theta_E)\cos\omega_o t\Big|_{LP} = \tfrac{1}{2}\Sigma_i S_i(t)\cos\theta_E \quad (36)$$

$$\Sigma_i \hat{S}_i(t)\sin(\omega_o t + \theta_E)\cos\omega_o t\Big|_{LP} = \tfrac{1}{2}\Sigma_i \hat{S}_i(t)\sin\theta_E \quad (37)$$

The sum of signals (36) and (37) is proportional to the synthetic version of a $T_T$ channel in accordance with the UMX matrixing system, namely, that shown in Equation (30).

A second synthetic supplementary channel $T_{EQ}$, which is a synthetic version of $T_Q$ channel in accordance with the UMX matrixing system, may similarly be formed, as follows:

$$T_{EQ} = \Sigma_i [S_i(t)\cos(\theta_E + \theta_i) - \hat{S}_i(t)\sin(\theta_E + \theta_i)] \quad (38)$$

In this connection, a $T_{EQ}$ synthetic supplementary signal may be obtained from the SSB signal $\delta_E(t)$:

$$\begin{aligned}\delta_E(t) &= \Sigma_i [S_i(t)\cos\theta_i\cos(\omega_o t + \theta_E) - \hat{S}_i(t)\sin\theta_i\cos(\omega_o t + \theta_E) \\ &\quad - \hat{S}_i(t)\cos\theta_i\sin(\omega_o t + \theta_E) - S_i(t)\sin\theta_i\sin(\omega_o t + \theta_E)] \\ &= \Sigma_i [S_i(t)\cos(\omega_o t + \theta_E + \theta_i) - \hat{S}_i(t)\sin(\omega_o t + \theta_E + \theta_i)] \quad (39)\end{aligned}$$

The $T_{EQ}$ signal is formed from the SSB signal $\delta_E(t)$ as follows:

$$T_{EQ} = 2\delta_E(t)\cos\omega_o t \quad (40)$$

Figure 10:
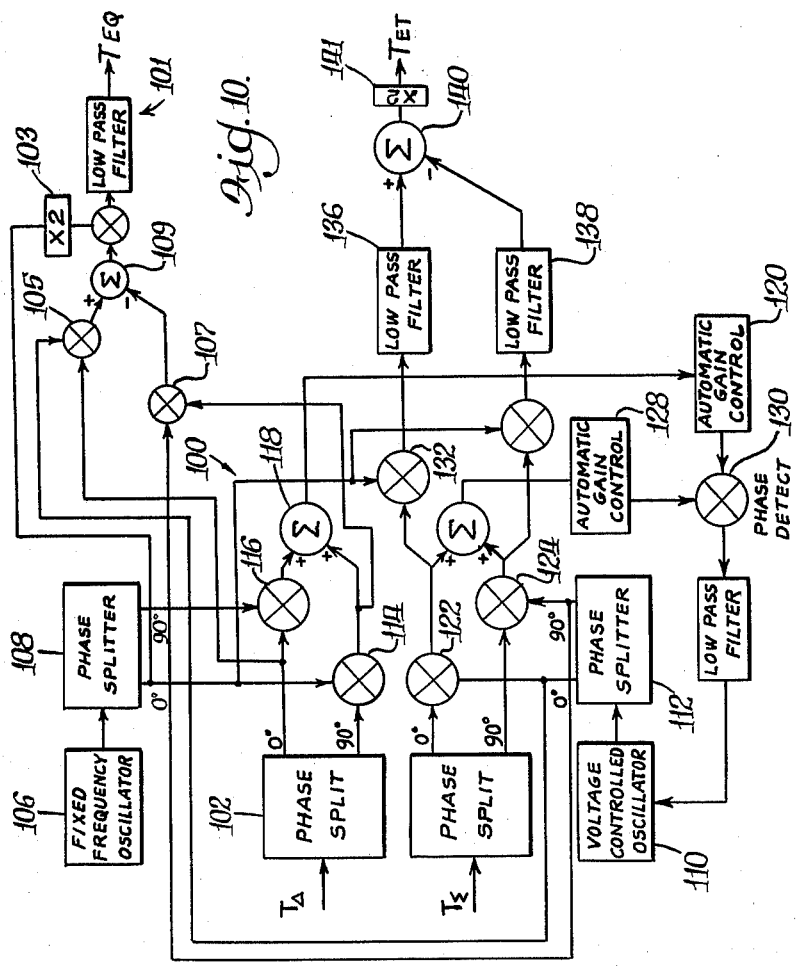
FIG. 10 is a schematic diagram of signal synthesis circuitry useful in image enhancement.

A signal generator 100 for synthesizing the synthetic supplementary channel $T_{ET}$ is shown in FIG. 10 of the drawings. The input signals to the signal generator 10 are the original transmission channel signals $T_\Delta$ and $T_\Sigma$ as may be obtained, for example, directly from FM broadcast. The $T_\Sigma$ and $T_\Delta$ input signals may also be obtained by rematrixing from the left and right, UMX transmission channel signals $T_L$ and $T_R$ or other locus-encoded linear combinations of the $T_\Sigma$ and $T_\Delta$ signals, recorded on the respective tape or disk or disk recording tracks of a tape or disk recording as indicated hereinabove.

In the signal generator 10, the $T_\Sigma$ and $T_\Delta$ original channel signals are transmitted through wideband 90° phase splitters 102, 104, respectively, which supply the phase related signals as shown in the drawing. The outputs of each phase splitter 102, 104 are subjected to double sideband modulation. In the illustrated embodiment, the $T_\Delta$ audio signal is subjected to double sideband modulation at the fixed carrier frequency $\omega_o$ of the fixed frequency oscillator 106, the output of which is transmitted through phase splitter 108 which supplies the phase related signals as shown in the drawing. The $T_\Sigma$ signal is subjected to double sideband modulation at the variable frequency of the voltage controlled oscillator 110, the output of which is similarly transmitted through a phase splitter 112, to provide a quadrature phase relation for the carriers.

The combination of the double sideband modulated $T_\Delta$ signals from the respective multiplier circuits 114, 116 at summer 118 produces the single sideband signal of $T_\Delta$ which is supplied to automatic gain control circuit 120. Similarly, the combination of the double sideband modulated $T_\Sigma$ signals from the respective multiplier circuits 122, 124 at summer 126 produces the single sideband signal of $T_{93}$ which is supplied to automatic gain control circuit 128. In this manner, the single sideband signals are provided, with a quadrature phase relation for the carriers, except for the further difference in phase represented by the difference between the estimated phase angle $\theta_E$ and the encoding phase angle to which it is to correspond. Phase detection at detector 130 produces a signal proportional to the sine of this difference, and this error signal is in turn applied as a control signal to the voltage controlled oscillator 110 to adjust its frequency to bring the error signal to a null.

The signal from multiplier 122 is supplied as an input signal to multiplier 132 which is also supplied with the 0° phase signal of phase splitter 108 as the other input signal. The signal from multiplier 124 is supplied as an input signal to another multiplier 134, which similarly is also supplied with the 0° phase signal of phase splitter 108 as the other input signal. The output signals of multipliers 132, 134 are each subjected to low pass filtering at low pass filters 136, 138, and the filtered signals are combined by summer 140 to provide upon multiplication by two by multiplier 141 the synthetic supplementary channel $T_{ET}$. The automatic gain-control circuits 120, 128 seek to maintain constant-level signals in well-known manners, and are included to seek to make the phase-lock loop operate nearly equally well with low-level salient signals as well as high-level ones. The second synthetic supplementary channel $T_{EQ}$ may be generated similarly by circuitry 101 also shown in FIG. 10. In this circuitry, the phase-splitter outputs for the signal $T_\Delta$ are supplied to a second single sideband modulator to generate $\delta_E(t)$ in a manner similar to the previously described generation of $\delta(t)$, but using the quadrature-pair oscillations from the voltage-controlled oscillator 110 instead of the fixed-frequency oscillator 106. However, the fixed frequency oscillator (with amplitude multiplied by 2 by amplifier 103) provides the oscillation used for demodulation. Accordingly, as shown in the drawing, the 0° signal from phase splitter 102 and the 0° signal from the phase splitter 112 are provided as input signals to multiplier 105, while the respective 90° signals from these phase splitters 102, 112 are provided as input signals to multiplier 107. The output signals of the multipliers 105, 107 are respectively added and subtracted at summer 109. The summer output and the amplified 0° signal from amplifier 103 form the inputs to multiplier 111, the output of which is passed through low pass filter 113 to provide the $T_{EQ}$ signal.

Many variations of the indicated phase lock-loop system are possible. The roles of the fixed-frequency and voltage-controlled oscillators may be interchanged; the two components of $\sigma_E(t)$ may be combined with reversed polarity and multiplied by $\cos\omega_o t$ to save one balanced modulator in forming $T_{ET}$, etc.

The synthetic channels $T_{ET}$ and $T_{EQ}$ will be continuously formed by the signal generator 10 regardless of whether the complex of sources contains a single salient source. On the other hand, the utility of these synthetic channels is questionable in the absence of such a salient source, and in such absence the synthetic channels generally ought best not be used in the decode. Consequently, it is desirable to make a test for saliency and to suppress the use of $T_{ET}$ and $T_{EQ}$ if the test be not satisfied.

In respect of the illustrated embodiment employing the $T_\Sigma$ and $T_\Delta$ input signals, this saliency test may be cast in terms of the signals $T_\Delta$ and $T^*_{ET}$, where the signal $T^*_{ET}$ is the complex conjugate of signal $T_{ET}$. In phasor notation, the sum of these two signals is given by:

$$\begin{aligned}T^*_{ET} + T_\Delta &= \Sigma_i S_i e^{-j\theta_E} + S_i e^{-j\theta_i} \\ &= e^{-j\theta_E} \Sigma_i S_i [1 + e^{j(\theta_E - \theta_i)}] \quad (41)\end{aligned}$$

Similarly, in phase notation, their difference is given by:

$$T^*_{ET} - T_\Delta = e^{-j\theta_E} \Sigma_i S_i [1 - e^{j(\theta_E - \theta_i)}] \quad (42)$$

Except for the phase-factor common to Equations (41) and (42), these describe BMX decodes for the bearing angles $\theta_E$ and $\theta_E + 180°$, and the difference in the levels of these two signals can provide the saliency indication. The signal $T_{ET}$ may be generated as the low-pass version of $\sigma_E \cos\omega_o t$, and may be obtained by transmitting the input of the automatic gain control block 128 to the input of a multiplier whose other input is supplied from the 0° output of phase splitter 120 and then transmitting the output of the multiplier through a low-pass filter.

Figure 11:
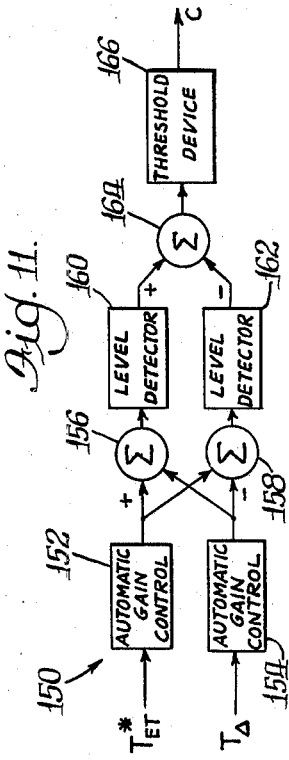
FIG. 11 is a schematic diagram of circuitry for generating an image enhancement control signal.

A control signal generator 150 for generating a control signal C based on this saliency test is shown in FIG. 11. The signals $T_{ET}^*$ and $T_\Delta$ are provided as essentially constant-level signals through the action of respective automatic gain control circuits 152, 154 indicated. The sum signal indicated by equation (41), and the difference signal indicated by Equation (42) are then formed by summer 156 and (negative) summer 158, respectively, as indicated in the drawing. The differences in the levels of the sum signal from summer 156, and the difference signal from summer 158, are determined by comparing the outputs of level detectors 160, 162 through subtraction of one of the level signals from the other by (negative) summer 164. The saliency condition may be selected, for example, at some predetermined ratio of the level of the sum signal to the level of the difference signal, which is intended to indicate a single image condition. When this condition is met, there would be at least this ratio between the strength of the decodable image at $\theta_E$ from the original transmission channels, and the 180° opposed location. In any event, the differences in the levels of these signals may be used to form the control signal C.

The level detectors 160, 162 shown may comprise a rectifier circuit and a filter. The filter may be arranged to exhibit two characteristic response times: an attack time and a release time, and these may be adjusted to match well with the characteristics of human hearing. Conventionally, the attack times may be on the order of 0.1 ms., and release times on the order of 100 ms. to one second. Thermoluminescent and electroluminescent devices may be combined with a photo diode for similar effects. Also, the level detectors may be provided with logarithmic characteristics, so that level differences may correspond to amplitude ratios, as indicated hereinabove.

The control signal C may be used to actuate gain-controlled amplifiers, and in this regard, the threshold device 166 of FIG. 11 may be set so that rather little change of the value C obtains if the level difference is less than a predetermined threshold corresponding to level differences that may be preassigned arbitrarily, but for which an assignment of at least about 6dB may be preferable. Above this threshold, large variations of signal C correspond to level variations. Except for these limitations, the variations of signal C provided by the threshold circuit 166 may be monotonic with variations in level difference.

The gain-controlled amplifiers actuated by signal C may exhibit gain variations from null transmission to full transmission in response to the whole range of the variation of C, in the case of the amplifiers that transmit signals $T_{ET}$ and $T_{EQ}$ to the matrix decode system. However, when full transmission of these signals obtains, there will be 3dB a loudness increase for a simple decode of the two original transmission channels plus the two synthetic channels $T_{ET}$ and $T_{EQ}$. To compensate for this, the transmission of each of the $T_{ET}$, $T_{EQ}$, $T_\Delta$, and $T_\Sigma$ signals may be reduced proportionately by up to 3dB corresponding to the full transmission of signals $T_{ET}$ and $T_{EQ}$, to compensate for the contribution of these channels to the decoded presentation signals. This compensation may be provided in a second set of four gain-controlled amplifiers to provide the 3dB variation, or the two functions may be combined in a single set of four appropriate amplifiers. The $T_\Sigma$, $T_\Delta$ (or $T_L$ and $T_R$) $T_{ET}$ and $T_{EQ}$ signals may be decoded in accordance with the disclosure of U.S. Pat. No. 3,906,156 with the $T_{ET}$ and $T_{EQ}$ signals being substituted for the $T_T$ and $T_Q$ signals, respectively.

In this connection, it is desirable to be able to form phase shifted versions of $T_{ET}$ and $T_{EQ}$ (to avoid the use of further phase shifter circuits) for these signals in the decode circuitry from the signals already formed by the signal generator 100 of FIG. 10. For example, $$\Sigma_i S_i(t)\cos(\omega_o t + \theta_E)\sin\omega_o t \bigg|_{LP} = -\frac{1}{2} \Sigma_i S_i(t)\sin\theta_E \quad (43)$$

$$\Sigma_i \hat{S}_i(t)\sin(\omega_o t + \theta_E)\sin\omega_o t \bigg|_{LP} = \frac{1}{2} \Sigma_i \hat{S}_i(t)\cos\theta_E \quad (44)$$

may be formed from signals available in the phase-lock loop circuit of FIG. 10, and their sum is the Hilbert transform of $T_{ET}$. Similarly, the Hilbert transform of $T_{EQ}$ is proportional to the signal $$\delta_E(t)\sin\omega_o t \bigg|_{LP}$$

With the availability of these phase-shifted versions, including phase-shifted versions of $T_\Sigma$ and $T_\Delta$, the remaining mixing functions of decoding need involve no further phase shifting, and may be carried out by the appropriate mixing of the indicated phase-shifted signals.

It should be pointed out, however, that the functions of modulation and demodulation, as used in the phase-lock loop, involve frequency-dependent phase shifts, arising mostly from the use of the necessary band-pass (not shown) and low-pass filters. These may be made to be essentially linear with frequency, to constitute simple delay. Matching delays may be inserted in the transmission path of signals $T_\Sigma$ and $T_\Delta$, and their phase shifted version before supplying these to the decode matrix.

The same phase-lock loop techniques may be used to generate synthetic supplementary channels for the 4-2-4 matrices known as QS (Sansui Electric Co.) and SQ (CBS Laboratories). For the QS matrix, it is known that, upon the insertion of a 90° phase shift between left and right channels, a BMX-type decode matrix may produce very good results. Thus, channels with properties very similar to $T_\Sigma$ and $T_\Delta$ may be derived after such phase insertion has been made, and processed as indicated hereinabove.

The encode equation for the two transmission channel SQ matrix is:

$$\begin{bmatrix} L_T \\ R_T \end{bmatrix} = \begin{bmatrix} -j0.7 & 1.0 & 0.0 & 0.7 \\ -0.7 & 0.0 & 1.0 & j0.7 \end{bmatrix} \begin{bmatrix} S_{LB} \\ S_{LF} \\ S_{RF} \\ S_{RB} \end{bmatrix} \quad (45)$$

from which the sum and difference ($L_T - R_T$) combinations are:

$$\begin{bmatrix} \Sigma_T \\ \Delta_T \end{bmatrix} = \begin{bmatrix} 1 & \angle -135° & 1 & 1 & 1\angle +45° \\ 1 & \angle -45° & 1 & -1 & 1\angle -45° \end{bmatrix} \begin{bmatrix} S_{LB} \\ S_{LF} \\ S_{RF} \\ S_{RB} \end{bmatrix} \quad (46)$$

in which for Equation (45) the number "0.7" is used where the square root of ½ is intended, so that all numerical coefficients in Equation (46) have magnitude unity. The two channels of Equation (46) may serve as the signal inputs for the phase-lock loop current 10 of FIG. 10.

The phase-lock loop will then form a phase estimate $\theta_E$ that is an estimate of the phase difference between $\Sigma_T$ and $\Delta_T$, namely, an estimate of $\theta$ in the following equation:

$$T\angle\theta = [1\angle 90° \quad 1\angle 0° \quad 1\angle 180° \quad 1\angle 90°] \begin{bmatrix} S_{LB} \\ S_{LF} \\ S_{RF} \\ S_{RB} \end{bmatrix} \quad (47)$$

Then, the circuit 10 will form channels by subtracting these phase differences from the phase of $\Sigma_T$, but adding them to the phase of $\Delta_T$, as follows, assuming one-at-a-time saliency for each of these sources:

$$\begin{bmatrix} T_{ET} \\ Q_{ET} \end{bmatrix} = \begin{bmatrix} 1 & \angle +135° & 1 & -1 & 1 & \angle -45° \\ 1 & \angle +45° & 1 & 1 & 1 & \angle +45° \end{bmatrix} \begin{bmatrix} S_{LB} \\ S_{LF} \\ S_{RF} \\ S_{RB} \end{bmatrix} \quad (48)$$

Upon forming sum and difference between these two signals $T_{ET}$ and $Q_{ET}$, the following two channels are derived:

$$\frac{1}{2}\begin{bmatrix} Q_{ET} + T_{ET} \\ Q_{ET} - T_{ET} \end{bmatrix} = \begin{bmatrix} j0.7 & 1.0 & 0.0 & 0.7 \\ 0.7 & 0.0 & 1.0 & j0.7 \end{bmatrix} \begin{bmatrix} S_{LB} \\ S_{LF} \\ S_{RF} \\ S_{RB} \end{bmatrix} \quad (49)$$

These channels may be named $L_{TE}$ and $R_{TE}$.

Under saliency conditions, there is thus obtained an augmented SQ matrix, as follows:

$$\begin{bmatrix} L_T \\ R_T \\ L_{TE} \\ R_{TE} \end{bmatrix} = \begin{bmatrix} -j0.7 & 1.0 & 0.0 & 0.7 \\ -0.7 & 0.0 & 1.0 & j0.7 \\ j0.7 & 1.0 & 0.0 & 0.7 \\ 0.7 & 0.0 & 1.0 & j0.7 \end{bmatrix} \begin{bmatrix} S_{LB} \\ S_{LF} \\ S_{RF} \\ S_{RB} \end{bmatrix} \quad (50)$$

This matrix equation is completely soluble for the source quantities $S_{LB}$, $S_{LF}$, $S_{RF}$, and $S_{RB}$. The classical test for this assertion is the calculation of the determinant of the 4 × 4 matrix of Equation (50). This determinant does not vanish, verifying the assertion.

A saliency test for the SQ matrix will be somewhat different than that proposed for BMX or QS, because of inherent asymmetries in the SQ matrix. Such saliency tests may be devised for the SQ matrix, and have been implemented in various versions of SQ "logic" circuitry that have been devised; such SQ-saliency test methods and apparatus may be utilized to provide a control signal governing the contribution of synthetic channels $L_{TE}$ and $R_{TE}$ to the decode matrix.

While this aspect of the present invention has been particularly described with respect to systems employing two original encoded transmission channels, it will be appreciated that synthetic supplementary channels may be provided for systems employing more than two original transmission channels. For example, in a system employing three original encoded transmission channels, such as may be exemplified by $T_L$, $T_R$ (or $T_\Sigma$, $T_\Delta$) and $T_T$ signals of the UMX matrixing system, a fourth, synthetic supplementary channel, such as signal $T_{EQ}$, may be generated from two or more of the original channels such as by utilizing the $T_\Sigma$ and $T_\Delta$ channels as discussed in connection with the apparatus of FIGS. 10 and 11 (without utilization of the $T_{ET}$ signal). However, it will be appreciated that the third original channel may be advantageously utilized with the other two original channels in the saliency test of single image locations, because the addition of the directional information of the third channel permits increased image resolution.

Another aspect of the present disclosure is directed to a logic system utilizing envelope generation in respect of at least two encoded original transmission channels for the provision of logic functions of source signal direction, even in the multiple source case where multiple sound sources at different bearing angles are encoded in the original transmission channels. The influence of the directional variation of the envelope-generated logic direction functions is limited to a frequency range below the audio band, and the envelope generated logic functions are utilized in the formation of a separate modulating signal for each presentation signal decoded from the original transmission signals.

The application of the envelope generation logic system to the basic two-channel matrix (BMX) of the universal matrix system (UMX) may hereinafter be referred to as a "BML" system, and this aspect of the present disclosure will now be more particularly described in respect of an embodiment of such a BML system.

The theory of such envelope generation rests upon the fact that if a time-dependent function, designated $x(t)$ for purposes of the following discussion, is a bandpass function, so that its spectrum is of negligible content near zero frequencies, and is also of negligible content for frequencies higher than $2f_c$, where $f_c$ is a central frequency in the bandpass, then the function $x(t)$ may be represented by the following:

$$x(t) = x_c(t)\cos\omega_c t + x_s(t)\sin\omega_c t \quad (51)$$

where $\omega_c = 2\pi f_c$ and $x_c(t)$ and $x_s(t)$ are low-pass time functions with frequency content below $f_c$. An envelope function $r(t)$ of the function $x(t)$ is then defined to be the square root of the sum of the squares of the $x_c(t)$ and $x_s(t)$ functions as follows:

$$r(t) = \sqrt{x_c^2(t) + x_s^2(t)} \quad (52)$$

Furthermore, a 90° phase shifter circuit (also known as a Hilbert-transform filter) is realizable for bandpass signals. Transmission of a bandpass signal $x(t)$ through such a phase shifter circuit produces a time dependent signal, which may be designated $y(t)$, as follows:

$$y(t) = -x_c(t)\sin\omega_c t + x_s(t)\cos\omega_c t \quad (53)$$

so that
$$x_s(t) = x(t)\sin\omega_c t + y(t)\cos\omega_c t \quad (54a)$$

$$x_c(t) = x(t)\cos\omega_c t - y(t)\sin\omega_c t \quad (54b)$$

From Equations (54) it may be seen that the fundamental definition, Equation (52), implies that the envelope function $r(t)$ may be obtained as the square root of the sum of the squares of the bandpass function $x(t)$ and its Hilbert transform signal $y(t)$, as follows:

$$r(t) = \sqrt{x^2(t) + y^2(t)} \quad (55)$$

Application of such envelope formation as utilized in multidirectional matrix logic systems will now be more particularly described in respect of signal processing for two channel matrix systems such as the two channel BMX matrix system, together with circuitry for accomplishing such processing.

For each audio signal [e.g., designated $x(t)$ in accordance with the previous discussion] of a BMX matrix, it will be appreciated that there are also obtainable the 90° phase shifted versions of each of these signals (e.g., $y(t)$ the leading phase version and $-y(t)$ for the lagging phase version). Thus, if $x_\Sigma(t)$ be the sum signal $T_\Sigma$ (i.e., $T_L$ plus $T_R$) and $x_\Delta(t)$ be the difference signal $T_\Delta$ (i.e., $T_R - T_L$) then for the example of a single source encoded in the BMX transmission channels, the following relationships may be established, and the indicated signals are all directly available or obtainable:

$$x_\Delta(t) = x(t)\cos\theta - y(t)\sin\theta \quad (56a)$$

$$y_\Delta(t) = y(t)\cos\theta + x(t)\sin\theta \quad (56b)$$

$$x_\Sigma(t) = x(t) \quad (56c)$$

$$y_\Sigma(t) = y(t) \quad (56d)$$

The indicated Equations (56) are given for a single source waveform $x(t)$ at a bearing angle of $\theta$, measured counterclockwise from the right direction.

As indicated by the previous discussion, envelope $r(t)$ of a function may be defined from $$r^2(t) = x^2(t) + y^2(t) \quad (57)$$

where $y(t)$ is the leading phase, 90° phase shifted version of the $x(t)$ signal.

In a similar manner, the envelope function $r_\Sigma(t)$ may be defined for the sum signal $x_\Sigma(t)$, and the envelope function $r_\Delta(t)$ may be defined for the difference signal $x_\Delta(t)$, as follows:

$$r_\Sigma^2(t) = x_\Sigma^2(t) + y_\Sigma^2(t) \quad (58a)$$

$$r_\Delta^2(t) = x_\Delta^2(t) + y_\Delta^2(t) \quad (58b)$$

Then, level-envelope signals $u(t)$ and $v(t)$ may be defined from Equations (58) for the sum signal $x_\Sigma(t)$ and the difference signal, as envelope-normalized versions of these signals and their phase shifted counterparts, respectively, as follows:

$$u_\Sigma(t) = x_\Sigma(t)/r_\Sigma(t) \quad (59a)$$

$$v_\Sigma(t) = y_\Sigma(t)/r_\Sigma(t) \quad (59b)$$

$$u_\Delta(t) = x_\Delta(t)/r_\Delta(t) \quad (59c)$$

$$v_\Delta(t) = y_\Delta(t)/r_\Delta(t) \quad (59d)$$

In the single source case, which is an important signal circumstance for logic systems, the envelope signal $r(t)$ for the audio signal $x(t)$, the envelope signal $r_\Sigma(t)$ for the sum signal $x_\Sigma(t)$, and the envelope signal $r_\Delta(t)$ for the difference signal are all equal, as may be readily verified. Thus, for a single source condition, $r(t) = r_\Sigma(t) = r_\Delta(t)$.

The sine and cosine functions of the source bearing angle $\theta$ may then be formed as functions of the level-envelope signals of Equations (59), as follows:

$$\cos\theta = u_\Sigma(t)u_\Delta(t) + v_\Sigma(t)v_\Delta(t) \quad (60a)$$

$$\sin\theta = u_\Sigma(t)v_\Delta(t) - v_\Sigma(t)u_\Delta(t) \quad (60b)$$

The signal functions of Equations (60) provide for the calculation of logic values (designated $\cos\theta_L$ and $\sin\theta_L$) of $\cos\theta$ and $\sin\theta$ in the multiple source signal case, for which case these logic values will be time varying, and should be subjected to low-pass filtering, resulting in the low-pass filtered logic values $c(\theta_L)$ and $s(\theta_L)$ as more slowly varying quantities:

$$c(\theta_L) = \cos\theta_L \Big|_{LP} \quad (61a)$$

$$s(\theta_L) = \sin\theta_L \Big|_{LP} \quad (61b)$$

The square root of the sum of the squares of the sine and cosine logic values defines a logic filter gain function $a$:

$$a^2 = s^2(\theta_L) + c^2(\theta_L) \quad (62)$$

such that the value of $a$ may range from zero to one:

$$0 \leq a \leq 1 \quad (63)$$

The exact value of the logic gain function, $a$, will depend upon the speed of fluctuation of the $\cos\theta_L$ and $\sin\theta_L$ signals.

The squares complement of the logic-filter gain function, $a$, may be denoted as a bias signal $b$:

$$b = 1 - \sqrt{a^2} \quad (64)$$

The bias signal $b$ will also vary from one to zero:

$$0 \leq b \leq 1 \quad (65)$$

The bias signal, $b$, and the logic values $S(\theta_L)$, $C(\theta_L)$, are used in the formation of the individual presentation signals for the different presentation directions. In this connection, a modulating function "M" is provided for each presentation signal, having a presentation bearing angle $\phi$ (measured counterclockwise from the right presentation direction), the modulating function being related to the sine and cosine values of the difference between the bearing angle of that presentation signal and the logic value of the encoded signal(s). Further in this regard, for the kth speaker at a bearing angle $\phi_k$, there is formed a signal $C_k$ for this speaker, as follows:

$$C_k = c(\theta_L)\cos\phi_k + s(\theta_L)\sin\phi_k \quad (66)$$

which is the filtered version of $\cos(\phi_k - \theta_L)$. The modulating function M for this kth speaker may be formed upon addition to the bias signal $b$, of this $C_k$ signal:

$$M_k = b + C_k \quad (67)$$

The modulating signal $M_k$ functions to modulate the signal for that speaker which is supplied from the matrix decode of the original transmission channels. This signal processing, including the provision of a modulating signal $M_k$, is carried out for each presentation signal for each speaker of the presentation array. The modulating signal $M_k$ for each presentation direction is then used to modulate the decode signal for that source direction to produce an over-all presentation function having directional sharpness which is enhanced through operations of the logic source encode values determined through the application of the appropriate envelope functions. Further in this regard, if there be but a single source signal encoded in the original transmission channels the signal for a given speaker will be substantially the same as the decode signal provided by decoding of the QMX matrix channels (e.g., signals $T_\Sigma$, $T_\Delta$, $T_T$ and $T_Q$), because for the single source case, $b = 0$, $a = 1$, and $C_k = \cos(\phi_k - \theta)$.

For the case of multiple sources, the logic value of the encoding direction, $\theta_L$, is "captured" by the strongest source, and this value changes as one or another source captures it in the course of time. Most of the time, it may be expected that $\theta_L$ will be only slowly time varying with characteristic frequencies well below the audio band. Under extremely complex signal conditions, however, fluctuations at an audio-band rate could characterize $\sin\theta_L$ and $\cos\theta_L$, causing waveform distortion. Then, the indicated low-pass filtering of $\sin\theta_L$ and $\cos\theta_L$ to produce $S(\theta_L)$ and $C(\theta_L)$ acts to progressively disconnect the BML system, by bringing the value of the logic gain function "$a$" near 0, and the value of the bias signal "$b$" near 1.

This filter presents a problem common to all gain-riding or compander-type circuits. The filter introduces a delay, so that the gain-riding function lags behind the signal conditions causing its actuation. Thus, linear filters should be used only if advance sensing of the signals may be provided. Otherwise, nonlinear filters characterized by differing attack and decay times should be used. Sometimes these should be multiple-stage filters employing a spectrum of decay times. Attack times of 1 ms and decay times grouped in the neighborhood of 100 ms are typical. The choice of these times are necessarily made to suit the specific application, and are based on acceptable performance to the ear, balanced (for decay times) against the waveform distortion introduced at the lowest audio frequency (e.g., 20 Hz). The "pumping" of more-or-less continuous low-level sounds on the part of sporadic high-level sounds is an effect that, in particular, should be kept of minimal aural consequence.

Figure 12:
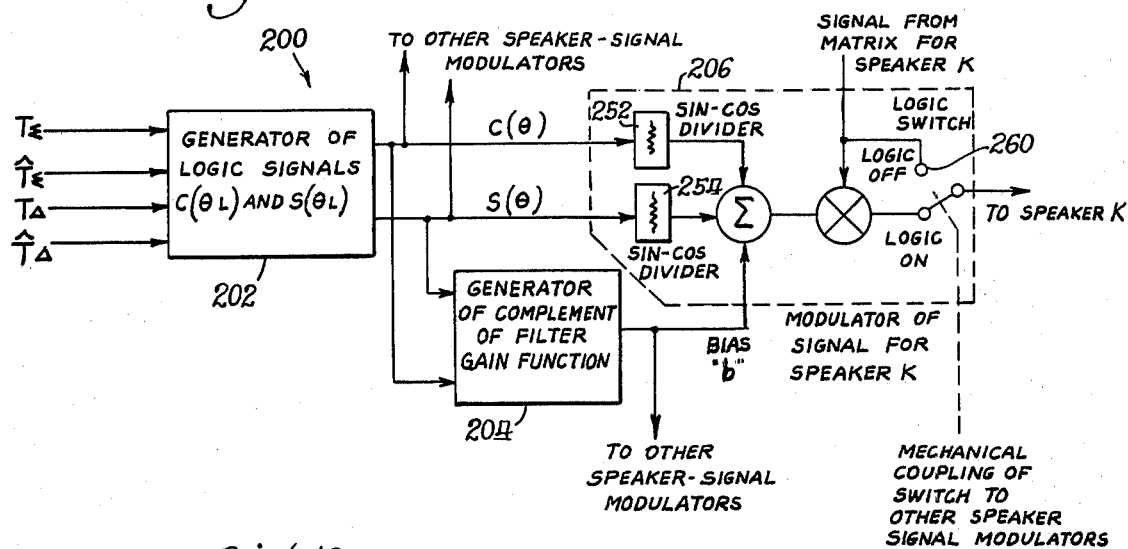
FIG. 12 is an overall schematic diagram of an embodiment of a matrix logic circuit.
Figure 13:
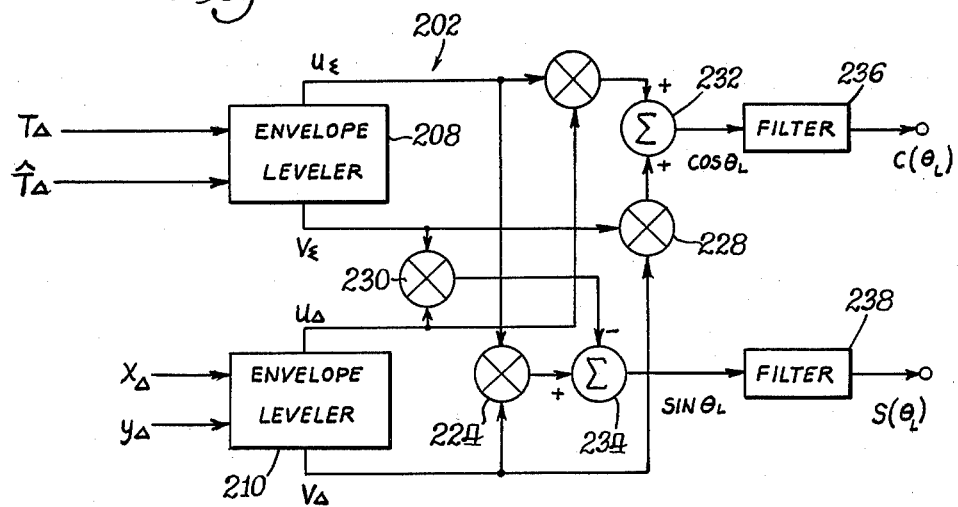
FIG. 13 is a schematic diagram of a processing block relating to the circuit of FIG. 12.
Figure 14:
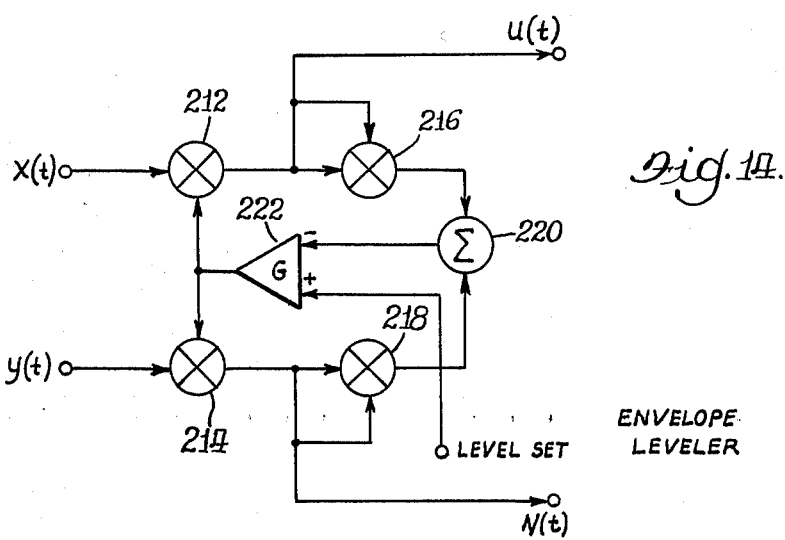
FIG. 14 is a schematic diagram of a processing block relating to the circuit of FIG. 13.
Figure 15:
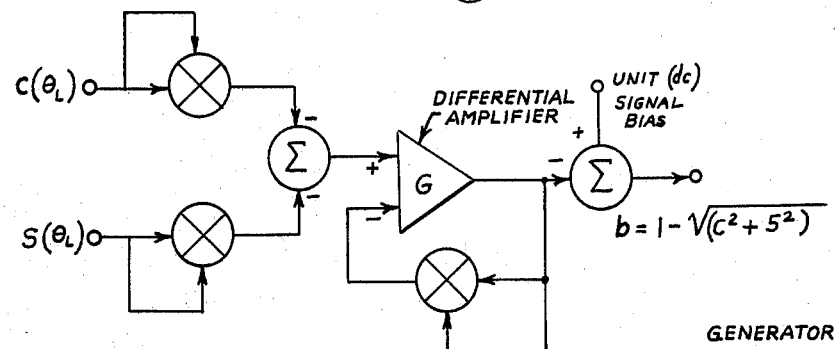
FIG. 15 is a schematic diagram of a processing block relating to the circuit of FIG. 12.

Schematically illustrated in FIGS. 12 through 17 is circuitry embodying various aspects of the BML system. FIG. 12 is an overall diagram of the various process blocks of the illustrated embodiment of an envelope-leveler logic system 200. FIGS. 13 and 15 show further detail of two of the processing blocks of FIG. 12, and FIG. 14, in turn, shows further detail of a precessing block of FIG. 13.

The envelope-leveler logic system 200 of FIG. 12 comprises a logic signal generator 202 which operates on input signals $T_\Sigma$ (corresponding to signal $x_\Sigma(t)$ of the previous discussion), $\hat{T}_\Sigma$ (corresponding to signal $y_\Sigma(t)$ of the previous discussion), $T_\Delta$ (corresponding to signal $x_\Delta(t)$ of the previous discussion) and $T_\Delta$ (corresponding to signal $y_\Delta(t)$ of the previous discussion). The signals $T_\Sigma$ and $T_\Delta$, as indicated hereinabove, may be provided from any of their linear combinations, such as signals $T_L$ and $T_R$, and the 90° leading phase shifted versions of these signals, $\hat{T}_\Sigma$ and $\hat{T}_\Delta$, respectively, may be provided by Hilbert transform circuit means (not shown) such as 90° phase shifters. The logic signal generator 202 provides the logic signals $C(\theta_L)$ and $S(\theta_L)$, which provide the input signals to the bias signal generator 204. The bias signal generator 204 in turn generates the bias signal "$b$," which is the complement of the filter gain signal "$a$" in accordance with the previous discussion. The bias signal generator 204 is illustrated in more detail in FIG. 15.

The logic signals $S(\theta_L)$ and $C(\theta_L)$ from this logic signal generator 202 also function as input signals, together with the bias signal $b$, for the speaker signal modulator 206. In the interest of representational clarity, only one speaker signal modulator 206 for the "$k$th" speaker is shown in FIG. 12; however, it will be understood that the logic circuit will include a separate modulator 206 for each output speaker signal, and bypass switching of this plurality of modulators may be mechanically ganged as indicated in the drawing. Each of the speaker signal modulators 206 is provided with the matrix decode signal for the respective speaker served by the modulator. The appropriate matrix decode signals may be provided by a decoder such as described in U.S. Pat. No. 3,906,156 which decodes the $T_\Sigma$ and $T_\Delta$ (or $T_L$ and $T_R$) signals to provide presentation signals in accordance with the UMX matrixing system. Having generally described the processing blocks of the illustrated BML system, the components and operation of the system will now be discussed in more detail. Turning to FIGS. 13 and 14, relating specifically to the logic signal generator 202, it will be seen that the input signals $T_\Sigma$ and its 90° phase shifted version $\hat{T}_\Sigma$ are transmitted to envelope leveler 208, while the signals $T_\Delta$ and its 90° phase-shifted version $\hat{T}_\Delta$ are transmitted to another envelope leveler 210. The envelope levelers 208, 210 are each of the type illustrated in FIG. 14, in which input signals (designated $x(t)$ and $y(t)$ in accordance with the nomenclature of the previous discussion of such signals, and which may be either the $T_\Sigma$, $\hat{T}_\Sigma$ or $T_\Delta$, $\hat{T}_\Delta$ signal pair) are respectively transmitted to multipliers 212, 214. The output signals from multipliers 212, 214 are the respective $u(t)$ and $v(t)$ function signals. The other input signal to each of the multipliers 212, 214 is the output signal of a feedback loop comprising multipliers 216, 218 (connected as squaring circuits for the $u(t)$ and $v(t)$ signals), summer 220 (to provide the sum of the squares of the $u(t)$ and $v(t)$ signals), and differential amplifier 222 (to provide a level-set control for the sum of the squares signal). The appropriate four combinations of the $v_\Sigma$, $v_\Delta$, $u_\Sigma$ and $u_\Delta$ output signals of envelope levelers 208, 210 are multiplied by multiplier circuits 224, 226, 288, 230 to provide the respective signals $u_\Sigma v_\Delta$, $u_\Sigma u_\Delta$, $v_\Sigma v_\Delta$ and $v_\Sigma u_\Delta$. The $u_\Sigma u_\Delta$ and $v_\Sigma v_\Delta$ signals are combined by summer 232 to produce a $\cos\theta$ signal, in accordance with Equation (60a) and the $v_\Sigma u_\Delta$ signal is subtracted from the $u_\Sigma v_\Delta$ signal by (negative) summer 234 to produce a $\sin\theta$ signal in accordance with Equation (60b). The respective $\cos\theta$ and $\sin\theta$ signals are transmitted through low pass filters 236, 238, which have a passband below the audio band (e.g., below about 20 Hz) to provide the filtered logic signals $C(\theta_L)$ and $S(\theta_L)$ in accordance with Equation (61).

As shown by FIG. 12, these logic signals are transmitted to the bias signal generator 204, which is shown in more detail in FIG. 15, where the logic signals $C(\theta_L)$ and $S(\theta_L)$ are squared by multipliers 240, 242, respectively. The phase inverted, squared signals are combined at summer 244, transmitted to differential amplifier 246 having a feedback loop including multiplier (as squarer) 248, the output of which is inverted at summer 250 to provide the bias signal "b" in accordance with Equation (64).

As shown in FIG. 12, the bias signal $b$ and the logic signals are transmitted to each of the speaker signal modulators, including the modulator 206 for the $k$th speaker shown in the drawings. In the modulators, the logic signals are transmitted to sin-cos dividers 252, 254 which are set to sin and cos values of the bearing angle of the particular speaker served by each modulator (i.e., angle $\phi_k$ for the $k$th speaker served by modulator 206). The signal $\cos\phi_k c(\theta_L)$ formed by sin-cos divider 252, the signal $\sin\phi_k S(\theta_L)$ formed by sin-cos divider 254, and the bias signal $b$ are combined by summer 256 to produce the modulating signal $M_k$ in accordance with Equation (67). The modulating signal $M_k$ in turn forms one input to multiplier 258, the other input being the matrix decode signal for the speaker. As indicated by FIG. 12, the illustrated BML system may be readily disconnected, if desired, by a gauged bypass switch 260.

Figure 16:
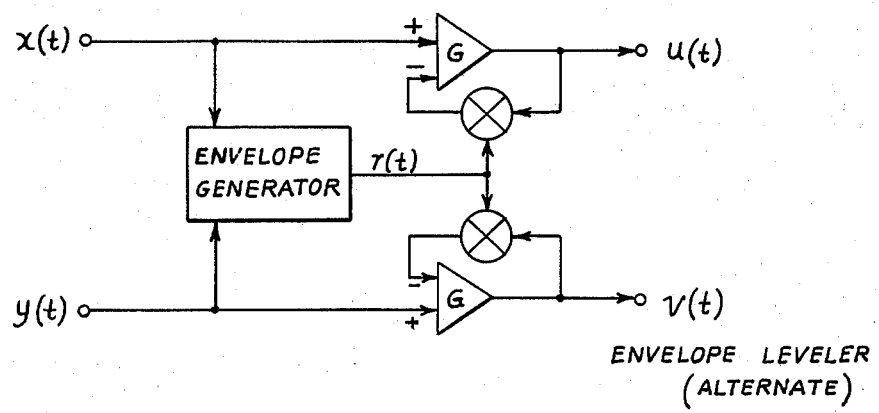
FIGS. 16 and 17 are schematic diagrams of envelope generation circuitry adapted for use in connection with the circuit of FIG. 12, and FIGS. 18 to 21 are schematic diagrams of circuitry for processing embodiments of stereo compatible multidirectional signals.

In addition to the novelty of the overall design of the BML system, the novelty of the envelope leveler shown in FIG. 14 in respect to its implicit generation of the envelope without the use of low pass filters (except for the filters used to obtain the 90° phase shift) should also be noted. An additional embodiment of such an envelope generator is shown in FIG. 16, and such envelope generators could have other applications such as applications in compander service. For example, such an envelope leveler could be used in the compander of Burwen described at pages 906-11 of the Acoustic Engineering Society Journal for December, 1971.

Figure 17:
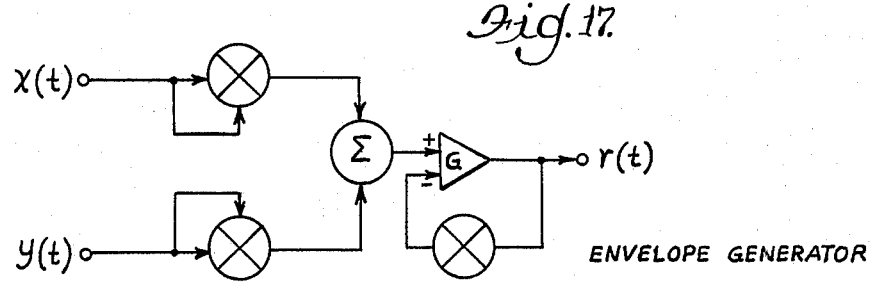

As indicated, an alternate embodiment of an envelope leveler 208, 210 to that of FIG. 14 is shown in FIGS. 16 and 17. The envelope leveler 250 of FIGS. 16 and 17 operates on input signals designated $x(t)$ and $y(t)$, $y(t)$ being the Hilbert transform signal of the $x(t)$ signal in accordance with the previous nomenclature. These input signals are supplied to envelope generator 252, which is shown in more detail in FIG. 17, in order to produce the envelope signal $r(t)$. In the envelope generator, the $x(t)$ and $y(t)$ signals are squared by respective multiplier circuits 254, 256 and the outputs are combined by summer 258. The sum of the squares output is supplied to a differential amplifier 260 with a feedback loop through multiplier 262 in order to produce the signal $r(t)$, as indicated in FIG. 16.

In the envelope leveler 250, the $x(t)$ and $y(t)$ signals are also supplied to respective differential amplifiers 264, 266 which are each included in a feedback loop through respective multipliers 268, 270. The envelope signal $r(t)$ is transmitted to each of the multipliers 268, 270 as a second input signal, and the (inverted) output of each of the multiplier 268, 270 is transmitted to the respective differential amplifier 264, 266 such that the amplifier outputs are, respectively, the desired $u(t)$ and $v(t)$ signals. The usual method of driving $r(t)$ is by means of full wave rectification of the input signal $x(t)$ followed by low pass filtering. However, such filtering is difficult for the proper removal of ripple for signals of frequencies predominantly near the lower end of the pass-band. This filtering also introduces a delay complicating the compander application — i.e., requiring the use of a nonlinear filter. It is believed that the filtering requirements for the envelope signal $r(t)$ of Equation (55) such as provided by the envelope leveler of FIG. 16, would not be nearly so severe in compander applications.

It will be appreciated that in FIGS. 14 through 17, high quality multipliers and/or squarers (indicated by the symbol ⊗) are used and shown as elements in high-gain (gain G) feedback loops. It will also be appreciated that the bandwidths of these elements are necessarily signal-level dependent, so that, even when such elements are providing a maximum signal-attenuation effect, care should be taken that the bandwidth is sufficient for loop stability. For equipment optimization, this requirement will imply unusually great bandwidths for the slight-attenuation conditions. While certain previous aspects of the present invention have been described in detail in respect of particular matrix signals such as $T_\Sigma$ and $T_\Delta$ signals, and linear combinations of these signals producing particular $T_L$ and $T_{12}$ signals, other combinations may also be utilized. For example, in addition to the $T_\Sigma$, $T_\Delta$ and $T_L$, $T_R$ linear combinations shown in Equations (23) and (24) [and the previously described combination of $T_T$ and $T_Q$ signals shown by Equations (25) and (26)], there are other combinations serving particular compatibility requirements. For example, in one system for making quadrasonic tape recordings, the number of tracks are doubled, in comparison to stereo practice, to provide tracks bearing the further information required. In particular, each of the original stereo tracks is subdivided into two tracks, a left signal track 300 and a right signal track 302, as shown in FIG. 8. The left track 300 is subdivided into left front and left back tracks 304, 306, and the right track 302 is similarly subdivided into right front and right back tracks 308, 310. The subdivided tracks then provide a kind of compatibility for playback on tape machines provided with only two-track-stereo pickup heads, in that the left track pickup will provide the front-back sum of the left track information, and the right track pickup will similarly provide the front-back sum of the right track information, to provide stereo-compatible signals.

As discussed in connection with Equations (6), (7), (8), and (9), however, this means of obtaining stereo-compatible signals omits all information of differentiation of front from back, excluding four-speaker decoding that presents such differentiation from the two signals alone, as may be provided in the manner of 4–2–4 matrices. A simple way to avoid this defect is to let the left-transmit and right-transmit signals of the 4–2–4 matrix appear as common signals in the two left channels and in the two right channels, respectively, the remainder in each being a matrix-supplement channel:

$$\text{"LF"} = T_L + M_L, \qquad (68)$$

$$\text{"LB"} = T_L - M_L, \qquad (69)$$

$$\text{"RF"} = T_R + M_R, \qquad (70)$$

$$\text{"RB"} = T_R - M_R, \qquad (71)$$

in which the matrix-supplement channels $M_L$ and $M_R$ are independent linear combinations, independent of $T_L$ and $T_R$, of the quadrasonic information necessary to provide a full discrete decode of that information.

A further condition may be placed on the matrix supplement channels, however, namely that "LF" should represent a predominantly left-front signal, and similarly for the other track signals.

A signal component "predominantly" appearing in one of four directional signals should have at least a 6 db higher level in that signal than the same signal component in any of the other three directional component signals if an impression approaching "discreteness" is to be the result.

For example, in the SQ-type 4-2-4 matrix $$\begin{bmatrix} L_T \\ R_T \end{bmatrix} = \begin{bmatrix} -j\sqrt{\frac{2}{2}} & 1 & 0 & \sqrt{\frac{2}{2}} \\ -\sqrt{\frac{2}{2}} & 0 & 1 & j\sqrt{\frac{2}{2}} \end{bmatrix} \begin{bmatrix} S_{LB} \\ S_{LF} \\ S_{RF} \\ S_{RB} \end{bmatrix} \quad (72)$$

the matrix supplement channels may be $$\begin{bmatrix} L_M \\ R_M \end{bmatrix} = \begin{bmatrix} j(1+\sqrt{\frac{2}{2}}) & 2 & 0 & 0 \\ 0 & 0 & 2 & -j(1+\sqrt{\frac{2}{2}}) \end{bmatrix} \begin{bmatrix} S_{LB} \\ S_{LF} \\ S_{RF} \\ S_{RB} \end{bmatrix} \quad (73)$$

The tape channels then are $$\begin{bmatrix} LB \\ LF \\ RF \\ RB \end{bmatrix} = \begin{bmatrix} -(1+\sqrt{2})j & -(\sqrt{2}-1) & 0 & \frac{\sqrt{2}}{2} \\ j & 1+\sqrt{2} & 0 & \frac{\sqrt{2}}{2} \\ -\frac{\sqrt{2}}{2} & 0 & 1+\sqrt{2} & -j \\ -\frac{\sqrt{2}}{2} & 0 & -(\sqrt{2}-1) & (1+\sqrt{2})j \end{bmatrix} \begin{bmatrix} S_{LB} \\ S_{LF} \\ S_{RF} \\ S_{RB} \end{bmatrix} \quad (74)$$

and the requisite predominance may be observed for the first row of Equation (74) as an example, by noting the numerical values 2.414, 0.414, and 0.707. Although the coefficients for the supplementary channels differ from those of U.S. Pat. No. 3,761,628 directed to the SQ matrix, the entire set of equations, Equations (72) and (73), are soluable for the four quantities $S_{LB}$, $S_{LF}$, $S_{RF}$, and $S_{RB}$, since the determinant of the coefficients does not vanish, as may be easily verified.

When four QMX channels of the UMX system are to be used, then suitable equations may be as follows:

$$T_L = je^{-j\frac{\theta}{2}} \sin\frac{1}{2}\theta S_\theta = \frac{1}{2}(T_\Sigma - T_\Delta) \quad (75)$$

$$T_R = e^{-j\frac{\theta}{2}} \cos\frac{1}{2}\theta S_\theta = \frac{1}{2}(T_\Sigma + T_\Delta) \quad (76)$$

and $$M_L = -je^{-j\frac{\theta}{2}} \cos\frac{3}{2}\theta S_\theta = \frac{1}{2}j(T_T + T_Q) \quad (77)$$

$$M_R = e^{-j\frac{\theta}{2}} \sin\frac{3}{2}\theta S_\theta = \frac{1}{2}j(T_T - T_Q) \quad (78)$$

Then "RF," according to Equation (70), for example, is $$\text{``RF''} = T_R + M_R = e^{-j\frac{\theta}{2}}(\cos\frac{1}{2}\theta + \sin\frac{3}{2}\theta)S_\theta \quad (79)$$

which is $$\text{``RF''} = 2\cos(\theta - \frac{\pi}{4})\cos\frac{1}{2}(\theta - \frac{\pi}{2})S_\theta e^{-j\frac{\theta}{2}} \quad (80)$$

Figure 9:
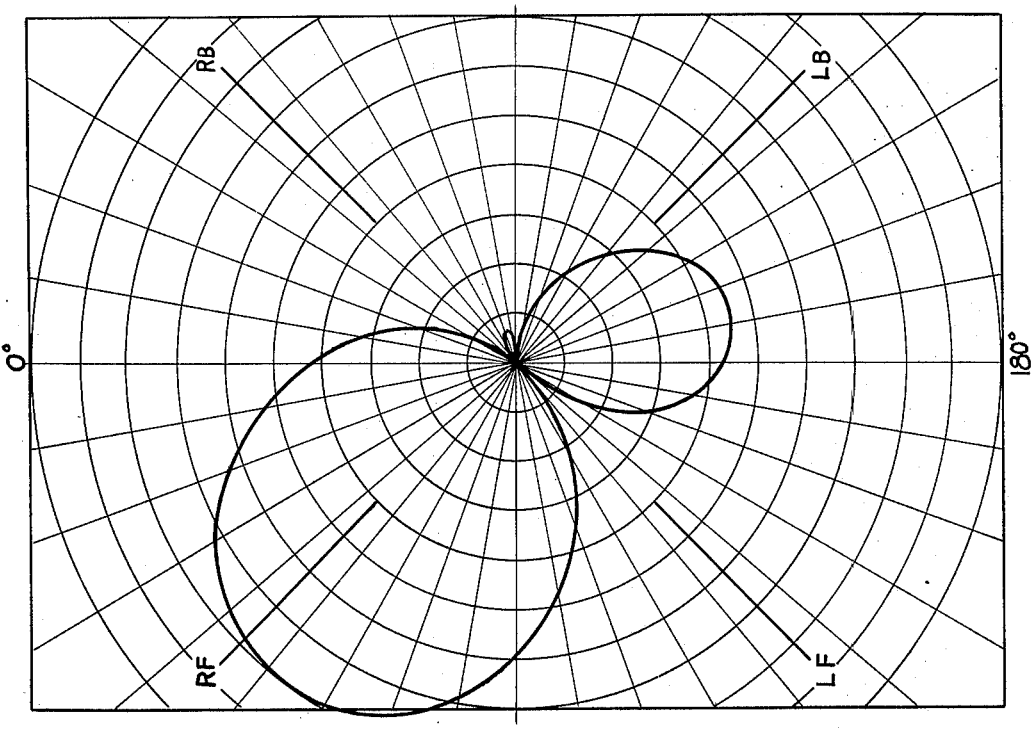
FIG. 9 is a polar plot of the magnitude of a matrix embodiment of a "right front" signal including a matrix-supplement signal.

The first trigonometric factor provides nulls at LF and RB, and the second at CB (center back), while the maximum is near RF, as may be seen in the plot of magnitudes in FIG. 9. Reflection about the CR (center right) axis provides the plot for "RB," while reflection about the CF axis produces the plot for "LF," etc. The requisite predominance is evident from the plot.

There are other specific linear combinations that are of interest, relating to stereo compatibility of the BMX matrix. For example, Equations (23) and (24) show linear combinations $T_L$ and $T_R$ of the $T_\Sigma$ and $T_\Delta$ channels, which are each null in respect of signals encoded from a direction corresponding to the encoding azimuth direction of the other of the $T_L$ and $T_R$ signals, which have encoding azimuths of 0° and 180°, respectively, (i.e., at center right and center left when the bearing angle $\theta$ is measured counterclockwise from the center right direction). However, many practitioners of quadrasonic disk recording are habituated to regarding left front (LF) and right front (RF) as the encoding points corresponding to stereo left and stereo right (SL and SR), and for a variety of reasons including left-right phase difference considerations, it may be desirable to provide stereo compatible encoding azimuths other than 0° and 180°. In general, if the encoding azimuths for SL and SR are to be moved forward by a given angular increment $\delta$, so that SL = 180°$-\delta$, and SR = $\delta$, with full separation to be obtained between these encoding points, then appropriate linear combinations $T_{SL}$ and $T_{SR}$ of $T_\Sigma$ and $T_\Delta$, which provide for stereo compatible encoding azimuths of $\delta$ and 180°$-\delta$, may be represented, as follows:

$$T_{SL} = \frac{1}{2}[\exp(-j\delta) T_\Sigma - T_\Delta] \quad (81)$$

$$T_{SR} = \frac{1}{2}[\exp(j\delta) T_\Sigma + T_\Delta] \quad (82)$$

These functions become respectively null at $\delta°$ and 180°$-\delta$; such that a source signal to be encoded from the $\delta°$ direction will not appear in the $T_{SL}$ signal and a source signal to be encoded from the 180°$-\delta$ direction will not appear in the $T_{SR}$ signal, thereby providing signals with stereo compatible encoding azimuths of $\delta°$ and 180°$-\delta$, respectively. The mono-compatible signal $T_{S\Sigma}$ for the $T_{SL}$ and $T_{SR}$ signals is then $$T_{S\Sigma} = \cos\delta T_\Sigma = T_{SL} + T_{SR} \quad (83)$$

while the difference signal $T_{S\Delta}$ is as follows:

$$T_{S\Delta} = T_{SR} - T_{SL} = j\sin\delta T_\Sigma + T_\Delta \quad (84)$$

Plainly $T_{S\Sigma}$ is omnidirectional while the illustrated example of $T_{S\Delta}$ shows the greater magnitude for the back half azimuths ($\theta$ between 0° and $-180°$).

The total energy of the two channels is $$|T_{SL}|^2 + |T_{SR}|^2 = (1 - \sin\theta\sin\delta)|S_\theta|^2 \quad (85)$$

and the front-back loudness ratio is calculated in the table below, for stereo playback Table 1.

| $\delta$ | CB/DF | RB/RF |
|---|---|---|
| 10° | 1.52 dB | 0.569 dB |
| 20° | 3.10 dB | 1.20 dB |
| 22.5° | 3.50 dB | 2.41 dB |
| 30° | 4.77 dB | 3.21 dB |
| 45° | 7.66 dB | 4.77 dB |

The left-right separation ratio is $$\frac{T_{SL}}{T_{SR}} = j\exp(-j\delta)\frac{\sin\frac{1}{2}(\theta-\delta)}{\cos\frac{1}{2}(\theta+\delta)} \quad (86)$$

which for $\theta = 135°$ is shown in the table below:

Table 2.

| $\delta$ | $[T_{SL}/T_{SR}]$ | Phase | CF (PWM) Phase |
|---|---|---|---|
| 10° | 9.40 dB | 80° | 56.9° |
| 20° | 11.81 dB | 70° | 42.5° |
| 22.5° | 12.59 dB | 67.5° | 38.7° |
| 30° | 15.67 dB | 60° | 26.9° |
| 45° | infinite | 45° | 0.00 |

The last column of the above is the left-right phase difference for equal signals encoded at LF and RF, the pairwise mix representation of CF. The formula of this column is $$2\tan^{-1}\left[\frac{1-\sqrt{2}\sin\delta}{\sqrt{2}\cos\delta}\right] \quad (87)$$

If 5 dB be regarded as a largest allowable loudness variation, but 3 dB be regarded as more tolerable, then, from Table 1, a suitable range for $\delta$ would be in the range of 20° to 30°, providing very desirable separation ratios and phases as may be seen in Table 2. The value $\delta = 22.5°$ may be taken as being of special interest.

A further adjustment of phase may be made by replacing $T_{SL}$ by $T_{SL}\exp(-j\sigma)$ and $T_{SR}$ by $T_{SR}\exp(j\sigma)$. It may be shown, however, that for $\sigma \neq 0°$, this introduces a loudness variation into $T_{S\Sigma}$ while not reducing the stereo loudness variation and not altering the left-right separation ratios. Thus, while not of great interest, this variation may find use in some applications.

The decode equations may be formed from $$T_\Sigma = \frac{1}{\cos\delta}[T_{SR} + T_{SL}] \quad (88)$$

$$T_\Delta = \frac{1}{\cos\delta}[T_{SR}\exp(-j\delta) - T_{SL}\exp(j\delta)] \quad (89)$$

according to Equation (14), omitting $T_T$ and $T_Q$, with the result $$P_\phi = \frac{1}{2\cos\delta}\{T_{SR}[1 + \exp j(\phi-\delta)] + T_{SL}[1 - \exp j(\phi+\delta)]\} \quad (90)$$

to obtain the BMX kernel, Equation (20). Insertion of $T_{SR}$ and $T_{SL}$ into a decoder specifically designed for decoding $T_R$ and $T_L$ signals generally will result in a presentation error that is small if $\delta$ be small, a backward shift on the right, and a forward shift on the left.

Of course, $T_{SL}$ and $T_{SR}$ may be used with supplementary channels such as the $T_T$ and $T_Q$ channels to obtain the OMX kernel and the enhanced directionality accruing therefrom. Similarly, sum-difference combinations analogous to Equations (75) - (78) may be devised which may be useful in applications such as tape recording. These are $$T_{SL} = je^{-j(\theta+\delta)/2}\sin\frac{1}{2}(\theta-\delta)S_\theta \quad (91)$$

$$T_{SR} = e^{-j(\theta-\delta)/2}\cos\frac{1}{2}(\theta+\delta)S_\theta \quad (92)$$

$$M_{SL} = -je^{-j(\theta+\delta)/2}\cos\frac{3}{2}(\theta-\frac{1}{9}\delta)S_\theta \quad (93)$$

$$M_{SR} = e^{-j(\theta-\delta)/2}\sin\frac{3}{2}(\theta+\frac{1}{9}\delta)S_\theta \quad (94)$$

Then a right front signal "RF" and a right back "RB" signal would be as follows:

$$\text{"RF"} = T_{SR} + M_{SR} = \quad (95)$$
$$2e^{-j(\theta-\delta)/2}\cos(\theta - \frac{\pi}{4} + \frac{\delta}{3})\cos\frac{1}{2}(\theta - \frac{\pi}{2} - \frac{\delta}{3})$$

$$\text{"RB"} = T_{SR} - M_{SR} = \quad (96)$$
$$2e^{-j(\theta-\delta)/2}\cos(\theta + \frac{\pi}{4} + \frac{\delta}{3})\cos\frac{1}{2}(\theta + \frac{\pi}{2} - \frac{\delta}{3})$$

with the corresponding "left" sum-differences showing mirror symmetry with these about the CF axis. It is seen that for $\delta = 22.5°$, the two factors in Equation (95) are rotated by only 7.5° in comparison to the two factors of Equation (80) so that very similar predominances may be expected in the corresponding plots.

The front-to-back loudness variation exhibited in Equation (85) may be compensated, if desired, in various ways. In this concentration, the loudness variation may be diminished by diminishing the contribution of $\delta$ at the front and back locations. One way of doing this is to replace $\delta$ by $d\cos\theta$ in Equation (81) and by $-d\cos\theta$ in Equation (82). However, this introduces the theoretical possibility of a substantial $\theta$ dependence not expressible by linear combinations of unity and $\exp(-j\theta)$, a substantial nondecodable $\theta$ dependence in that the decode may not be arranged to produce a dependence solely upon the difference between source and presentation azimuths. In this case, in order to avoid such complications, it is appropriate to provide that $d$ will be small, (e.g., about 0.35 or less), so that the error contribution will be small (e.g., 10 db or more lower than the $\theta$ dependent signal component). Then the approximation $$\exp(-jd\cos\theta) \simeq \lambda - jd\cos\theta \quad (97)$$

will have the further advantage of simplifying the error term, a term which is expressible in terms of $\exp(-j\theta)$ and $\exp(j\theta)$, so that this term would be decodable if a third channel were to be available. In this approach, the polarity pattern of $\cos\theta$ has much the same effect as the change in polarity for $\delta$ between Equations (81) and (82), and $\lambda$ is to be a parameter to permit $T_{SL}$ to be null in both its real and imaginary parts.

With these modifications, we have the $\lambda$ formulation, $$T_{SL} = \frac{1}{2}\Sigma_i S_{\theta_i}[\lambda - jd\cos\theta_i - \cos\theta_i + j\sin\theta_i]$$

-continued $$T_{SR} = \frac{1}{2} \Sigma_i S_{\theta i} [\lambda - jd\cos\theta_i + \cos\theta_i - j\sin\theta_i]$$

and $T_{SL}$ is null for $\theta_i = \theta$ such that $$d = \tan\theta \tag{98}$$

and $$\lambda = \cos\theta$$

These two equations are compatible if $$(\frac{1}{\lambda})^2 = 1 + d^2$$

or $$K = \frac{1}{\lambda} = \sqrt{1 + d^2} \tag{99}$$

in which K would appear in the alternative K formulation $$T_{SL} = \frac{1}{2} \Sigma_i S_{\theta i} [1 - jd\cos\theta_i - K\cos\theta_i + j\sin\theta_i] \tag{100}$$

$$T_{SR} = \frac{1}{2} \Sigma_i S_{\theta i} [1 - jd\cos\theta_i + K\cos\theta_i - j\sin\theta_i] \tag{101}$$

The null for $T_{SR}$, allowing for a reversal in polarity of $\cos\theta$ obtains at the same value for $\sin\theta$ but because of the reversal in polarity of the cosine, the null angle is $180° - \tan^{-1}d$, for $T_{SR}$, but $\tan^{-1}d$ for $T_{SL}$. Thus, a value of $d$ corresponding to $\delta = 20°$ is $d = 0.36$, and for this value, $K = 1.06$. The total energy corresponding to Equation (85) does, however, show a loudness variation of the same energy magnitude and pattern as the mono variations, corresponding to Equation (83), namely $1 + d^2\cos^2\theta$, with a maximum energy ratio $(1 + d^2)$ to 1. Both front and back are diminished in loudness by about 0.5 dB for $d = 0.36$, relative to the sides.

Decode follows from the fact that the three equations $$T_{SL} = \frac{1}{2} u - \frac{1}{2} (K + jd)\cos\theta + \frac{1}{2} j\sin\theta \tag{102}$$

$$T_{SR} = \frac{1}{2} u + \frac{1}{2} (K - jd)\cos\theta - \frac{1}{2} j\sin\theta \tag{103}$$

$$-jT_{ST} = du - j\cos\theta + K\sin\theta \tag{104}$$

may be solved for $u$, $\cos\theta$, and $\sin\theta$ in terms of $T_{SL}$, $T_{SR}$, $-jT_{ST}$, the determinant being unity. From these solutions, the combinations $$T_\Sigma = u \tag{105}$$

$$T_\Delta = \cos\theta - j\sin\theta \tag{106}$$

$$T_T = \cos\theta + j\sin\theta \tag{107}$$

may be assembled for decode in a usual TMX fashion. Then, if $T_{ST}$ be made zero, an approximate BMX decode enjoying benefits thereof is the result. The above equations are, of course, compatible with the use of a usual UMX fourth channel, $T_Q$, and other linear combinations of these channels may also be provided.

The solutions corresponding to Equations (105), (106), and (107) are $$T_\Sigma = (T_{SR} + T_{SL}) \frac{1}{2} (K^2 + 1) + \tag{108}$$

$$\frac{1}{2} (T_{SR} - T_{SL}) jKd + \frac{1}{2} T_{ST} jd$$

$$T_\Delta = (T_{SR} + T_{SL}) \frac{1}{2} jd(K + 1) \leftarrow \tag{109}$$

$$\frac{1}{2} (T_{SR} - T_{SL})(1 + K + d^2) - \frac{1}{2} T_{ST}(K - 1)$$

$$-T_T = (T_{SR} + T_{SL}) \frac{1}{2} jd(K - 1) + \tag{110}$$

$$\frac{1}{2} (T_{SR} - T_{SL})(1 - K + d^2) - \frac{1}{2} T_{ST}(K + 1)$$

as exact expressions for signals suitable for TMX decode, or QMX decode, if $T_Q$ be also available. If $T_{ST}$ be not available, then Equation (68) becomes simply $T_\Sigma$ plus the following error terms:

$$E_\Sigma = \frac{1}{2} d^2 T_\Sigma - \frac{1}{2} jd\Sigma_i S_i \cos\theta_i + \frac{1}{2} Kd\Sigma_i S_i \sin\theta_i \tag{111}$$

and Equation (109) becomes simply $T_\Delta$ plus the following error terms:

$$E_\Delta = \frac{1}{2} jd(K - 1)T_\Sigma + \frac{1}{2} (K - 1)\Sigma_i S_i \cos\theta_i + \frac{1}{2} jK(K - 1)\Sigma_i S_i \sin\theta_i$$

as nondecodable terms causing an error in the BMX decode.

The utility of the $d$ formulation plainly depends upon $d$ being small (K near unity), since the compromise with the fully decodable $\delta$ formulation is for trading the nondecodable terms against the larger loudness variation of the $\delta$ formulation. The $\sigma$ phase shifts may also be introduced in the $d$ formulation with further loudness variation in mono only.

Stereo compatible transmission channels having encoding loci at other than 0° and 180° may, of course, be used in systems employing synthetic supplementary channels or logic systems, such as envelope logic systems, as described hereinabove. The stereo compatible transmission channel signals may be recorded on conventional recording media such as magnetic tape and recording disks by means of known apparatus and procedures. For example, the $T_{SL}$ and $T_{SR}$ signals may be recorded as the left and right channels of a recording disk by means of a 45—45 cutter, and the recording may be played back by conventional monaural and stereo recording equipment, as well as suitable matrix decode equipment. Furthermore, additional channels such as $T_T$ or $T_{ST}$ and $T_Q$ may be recorded with the $T_{SL}$ and $T_{SR}$ signals as angularly modulated signals in a multiple frequency manner as generally described in application Ser. No. 468,238 referred to hereinabove.

Figure 18:
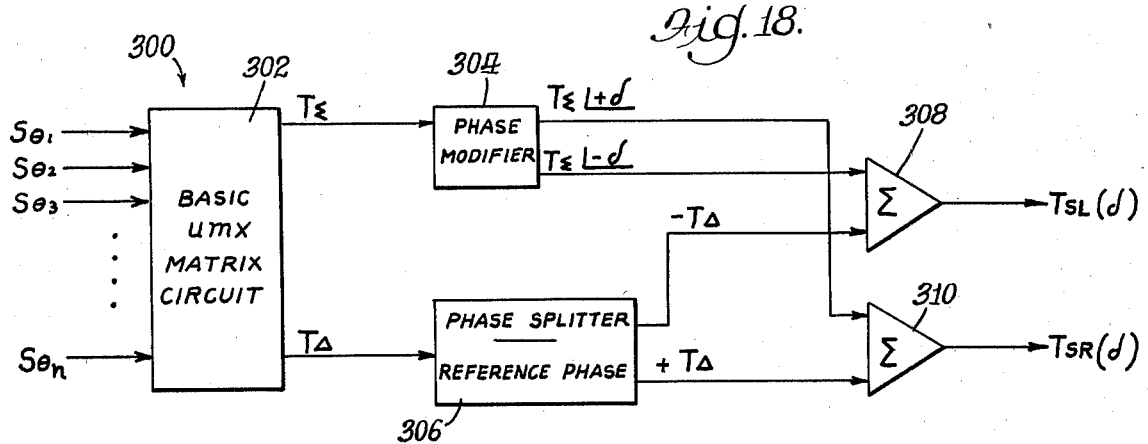

Apparatus to provide or decode the mono and stereo-compatible signals may comprise means for producing and combining the various signal components defined by Equations (80), (81) and (100)-(107), respectively, and conventional circuit elements having the appropriate functional parameters may be used for this purpose. Illustrated in FIG. 18 is an embodiment of apparatus 300 for providing signals $T_{SL}$ and $T_{SR}$ as defined by Equations (81) and (82). In the encoding apparatus 300, source signals are transmitted to a basic UMX matrix circuit 304, such as described in U.S. Pat. No. 3,906,156 to provide signals $T_\Sigma$ and $T_\Delta$. The $T_\Delta$ signal is transmitted through polarity splitter 306 to provide $+T_\Delta$ and $-T_\Delta$ versions of this signal. Phase modifier 304 provides phase modified versions of the $T_\Sigma$ signal which are respectively leading, and lagging the $T_\Sigma$ signal in phase by $\delta°$ (in respect of the $T_\Delta$ signal from splitter 306). The lagging $T_\Sigma$ signal and the $-T_\Delta$ are combined in summer 308 to provide the $T_{SL}$ signal. The $+T_\Delta$ signal is combined with the leading $T_\Sigma$ signal at summer 310 to provide the $T_{SR}$ signal. The $T_{SL}$ and $T_{SR}$ signals are shown with a ($\delta$) subscript to indicate the stereo compatible signals of Equations (81) and (82).

Figure 19:
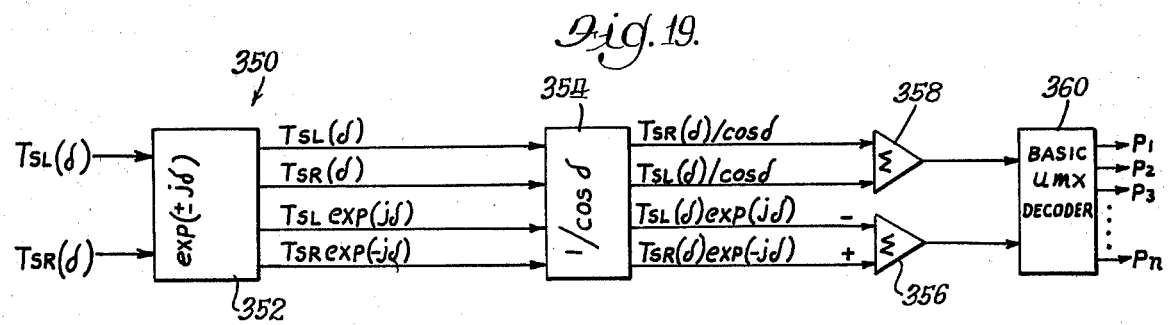

Illustrated in the FIG. 19 is apparatus 350 for decoding this $\delta$ version of the stereo compatible signals $T_{SL}$ and $T_{SR}$. These signals are transmitted to matrix means 352 which provides signals $T_{SR}\exp(-j\delta)$ and $T_{SL}\exp(j\delta)$, together with the original signals which, in turn, are fed to means 354 which applies the factor $1/\cos\delta$ to the signals, appropriate combinations which are combined at summers 358 and 356 to provide UMX signals $T_\Sigma$ and $T_\Delta$, which are fed to a basic UMX decoder 360 to produce speaker presentation signals.

Figure 20:
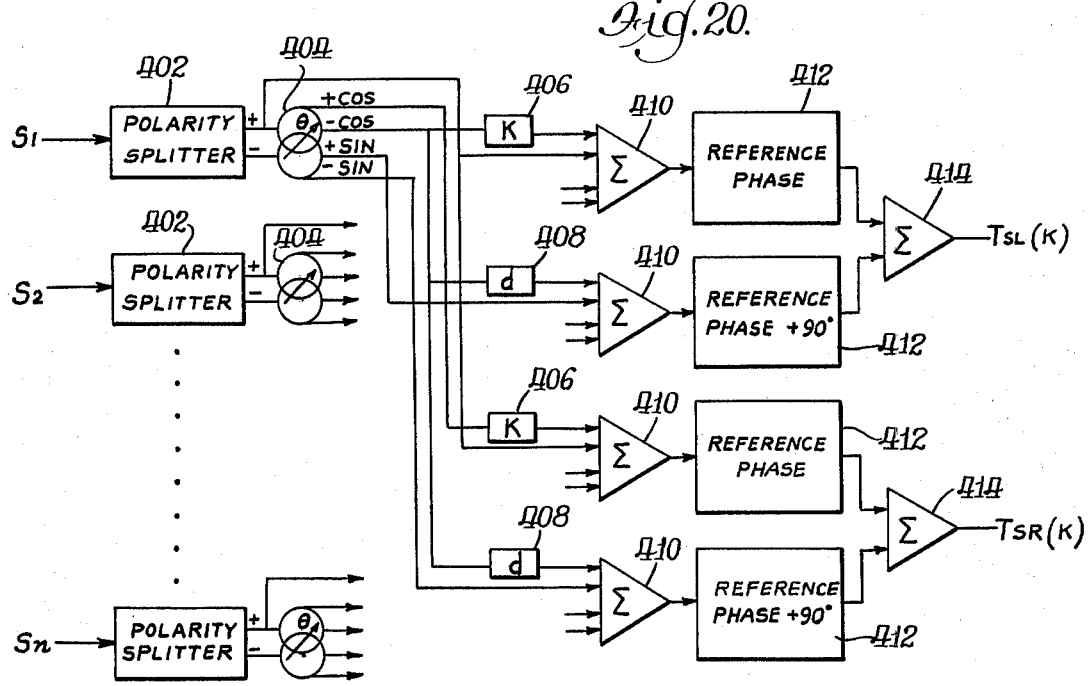

Illustrated in FIG. 20, which is analogous to FIG. 7 of U.S. Pat. No. 3,906,156, is circuitry 400 for producing the "K" version of signals $T_{SL}$ and $T_{SR}$ as defined by Equations (100) and (101). In this apparatus, each source signal is transmitted to a polarity splitter 402, the outputs of which are in turn transmitted to sin-cos pots 404 adjusted to the respective bearing angle of the source. For each source signal, the $-\cos$ and the $+\cos$ signals are appropriately modified as indicated by means 406 for introducing the "K" factor, and means 408 for introducing the "$d$" factor, and the appropriate signals are combined at summers 410. The proper phase relationship is provided by reference phase and $+90°$ phase shifters 412, 416. The appropriate combination of signals are combined at summer 414 to respectively provide the $T_{SL}$ and $T_{SR}$ signals, which are shown having a (K) subscript to indicate the "K" version of signals defined by Equations (100) and (101).

Figure 21:
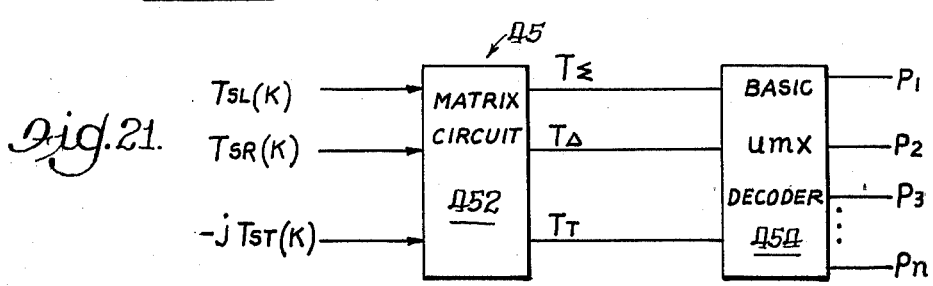

Illustrated in FIG. 21 is apparatus 450 for decoding stereo compatible signals of the "K" formulation in accordance with Equations 102-107. In this connection, signals $T_{SL}$, $T_{SR}$ and $-jT_{ST}$ are transmitted to a matrix circuit means 452 which solves the matrix of Equations 102-104, the determinant of the matrix being unity, to produce the $T_\Sigma$, $T_\Delta$ and $T_T$, as set forth in Equations 105-107. As indicated hereinabove, the $T_{ST}$ signal is a stereo compatible third channel, including signal components adapted to compensate for error terms which would otherwise be introduced in the basic UMX decode. While means for producing $T_{ST}$ third channel signals are not illustrated, it will be appreciated by one skilled in the art that the defined components of this signal may be combined by appropriate apparatus in view of the teachings of this disclosure and the previously referred to patents and applications. The signals $T_\Sigma$, $T_\Delta$ and $T_T$ provided by the matrix circuit 452 are transmitted to a basic UMX decoder 454 which provides directional loudspeaker signals for presentation to a listener.

It will be appreciated that various sign changes may be made in the definitions of certain of the signals and that signals have generally been defined herein in respect of a unit magnitude which may be varied as desired. Moreover, while aspects of the present invention have been described with respect to various specific embodiments, it will be apparent that numerous variations, modifications and adaptations may be made by one skilled in the art based on the present disclosure, and such modifications, variations and adaptations are intended to be included within the spirit and scope of the present invention as set forth in the following claims.

Various of the features of the invention are set forth in the following claims.

What is claimed is:

1. In a method for decoding at least two original matrixed transmission channels having multidirectional source signals encoded therein with predetermined amplitude and phase relations indicative of source directions and adapted to be decoded for formation of more than two loudspeaker presentation signals, the improvement comprising generating at least one synthetic supplementary channel from said original transmission channels having predetermined amplitude and phase relations differently indicative of source directions relative to the amplitude and phase relations of the multidirectional source signals encoded in said original transmission channels, by steps comprising detecting source signal image direction from the signals of said original transmission channels and providing said source signals matrixed in each such synthetic supplementary channel with amplitude and phase relations for such detected source signal image direction differently indicative of source directions from the amplitude and phase relations of said original matrixed channels, and decoding said original transmission channels and said synthetic supplementary channels to provide multidirectional presentation signals having enhanced image location.

2. A method in accordance with claim 1 wherein the contribution of said synthetic channels to the decoding is determined as a function of the saliency of single-image conditions of the source signals in said original channels.

3. A method in accordance with claim 1 wherein said original transmission channels are channels $T_\Sigma$ and $T_\Delta$, and $T_L T_R$, or $T_{SL}$ and $T_{SR}$, of an UMX matrix system or other linear combinations thereof, and wherein one synthetic supplementary channel is channel $T_{ET}$.

4. A method in accordance with claim 3 wherein one synthetic supplementary channel is channel $T_{EQ}$.

5. A method in accordance with claim 1 wherein said decoding of said original and synthetic supplementary channels is carried out by decoding said original channels to provide a first set of more than two loudspeaker signals for presentation at more than two listening space bearing angles and having source signals corresponding to every source direction appearing in a plurality of such presentation signals but in different relative amplitude, decoding said synthetic supplementary channel or channels to provide a second set of a plurality of signals for presentation at listening space bearing angles corresponding to the listening space bearing angle presentation directions of said first set of presentation signals, and adding to each of said first set of signals the signal of said second set of signals for the corresponding listening space bearing angle to provide a plurality of presentation signals for the presentation directions corresponding to the presentation directions of said first set of presentation signals but with a sharpened directionality pattern with respect to that of said first set of signals.

6. A method in accordance with claim 1 wherein said detecting of source signal directions is carried out by phase lock loop detection.

7. A method in accordance with claim 2 wherein the contribution of said original channels to the presentation signals is compensatingly reduced proportionately to the amount of contribution of the synthetic supplementary channels.

8. In a matrix decoder for decoding at least two original matrixed transmission channels having multidirectional source signals encoded therein with predetermined amplitude and phase relations indicative of source direction, to provide at least three multidirectional loudspeaker presentation signals, the improvement comprising means for generating at least one synthetic supplementary channel by detecting source image location direction from the original transmission channels and for providing said source signals in each of said synthetic supplementary channels with amplitude and phase relations for such detected source signal image direction differently indicative of source direction from the amplitude and phase relations in said original channels, and means for decoding said synthetic supplementary channel or channels with said original transmission channels to provide presentation signals with enhanced image location.

9. A matrix decoder in accordance with claim 8 further comprising means for testing the saliency of single image conditions of said original channels and for adjusting the contribution of said synthetic supplementary channels to the presentation signals as a function of said saliency.

10. A decoder in accordance with claim 8 wherein said synthetic supplementary channel generating means includes a phase-lock loop detector for determining source signal encoding angles, and wherein said decoder is a decoder for UMX channels $T_\Sigma$ and $T_\Delta$, $T_L$ and $T_R$, $T_{SL}$ and $T_{SR}$, or other linear combinations thereof.

11. A decoder in accordance with claim 10 wherein one of said synthetic supplementary channels is signal $T_{ET}$.

12. A decoder in accordance with claim 10 wherein one of said synthetic supplementary channels is signal $T_{EQ}$.

13. A decoder in accordance with claim 8 wherein said means for decoding of said original and synthetic supplementary channels comprises means for decoding said original channels to provide a first set of more than two loudspeaker signals for presentation at more than two listening space bearing angles and having source signals corresponding to very source direction appearing in a plurality of such presentation signals but in a different relative amplitude, means for decoding said synthetic supplementary channel or channels to provide a second set of a plurality of signals for presentation at listening space bearing angles corresponding to the listening space bearing angle presentation directions of said first set of presentation signals, and means for adding to each of said first set of signals the signal of said second set of signals for the corresponding listening space bearing angle to provide a plurality of presentation signals for the presentation directions corresponding to the presentation directions of said first set of presentation signals but with a sharpened directionality pattern with respect to that of said first set of signals.

14. A method in accordance with claim 9 further including means for reducing the contribution of said original channels to the presentation signals proportionately to the amount of contribution of the synthetic supplementary channels to compensate for the synthetic channel contribution.

* * * * *